(12) United States Patent
Halverson et al.

(10) Patent No.: US 11,333,393 B2
(45) Date of Patent: May 17, 2022

(54) CONDENSATE MANAGEMENT SYSTEM

(71) Applicant: 3M INNOVATIVE PROPERTIES COMPANY, St. Paul, MN (US)

(72) Inventors: Kurt J. Halverson, Lake Elmo, MN (US); Steven P. Swanson, Blaine, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 213 days.

(21) Appl. No.: 16/466,179

(22) PCT Filed: Nov. 29, 2017

(86) PCT No.: PCT/IB2017/057494
§ 371 (c)(1),
(2) Date: Jun. 3, 2019

(87) PCT Pub. No.: WO2018/104827
PCT Pub. Date: Jun. 14, 2018

(65) Prior Publication Data
US 2020/0124319 A1 Apr. 23, 2020

Related U.S. Application Data

(60) Provisional application No. 62/430,295, filed on Dec. 5, 2016.

(51) Int. Cl.
*F24F 13/22* (2006.01)
*F25D 21/14* (2006.01)
*C08J 5/18* (2006.01)

(52) U.S. Cl.
CPC .............. *F24F 13/222* (2013.01); *C08J 5/18* (2013.01); *F24F 2013/227* (2013.01); *F25D 21/14* (2013.01)

(58) Field of Classification Search
CPC ......... F25D 21/14; B25G 1/102; A63B 60/14; C08J 5/18
See application file for complete search history.

(56) References Cited

U.S. PATENT DOCUMENTS 3,750,418 A * 8/1973 Maudlin ................. F25B 39/02
62/290
5,514,120 A 5/1996 Johnston
(Continued)

FOREIGN PATENT DOCUMENTS

CN 201695517 1/2011
EP 1358064 11/2003
(Continued)

OTHER PUBLICATIONS

International Search Report for PCT International Application No. PCT/IB2017/057494, dated Mar. 27, 2018, 4 pages.

*Primary Examiner* — Lionel Nouketcha
(74) *Attorney, Agent, or Firm* — Qiang Han

(57) ABSTRACT

A condensation management system includes an elongated flexible film configured to be stretched under tension between a first film support and a second film support. The film includes first and second ends that extend laterally across a width of the film. The film includes first and second sides that extend longitudinally between the first and second film ends. The film has a concave surface and an opposing convex surface extending between the first and second sides of the film. Microchannels are disposed in at least one of the concave surface and the convex surface. The microchannels induce a predetermined radius of curvature in the concave and convex surfaces of the film when the film is stretched longitudinally between the first and second film supports.

13 Claims, 25 Drawing Sheets

(56) References Cited

U.S. PATENT DOCUMENTS

| | | | |
|---|---|---|---|
| 5,585,186 | A | 12/1996 | Scholz |
| 5,728,446 | A | 3/1998 | Johnston |
| 6,372,323 | B1 | 4/2002 | Kobe |
| 6,372,954 | B1 | 4/2002 | Johnston |
| 6,375,871 | B1 | 4/2002 | Bentsen |
| 6,420,622 | B1 | 7/2002 | Johnston |
| 6,531,206 | B2 | 3/2003 | Johnston |
| 6,746,567 | B2 | 6/2004 | Johnston |
| 6,803,090 | B2 | 10/2004 | Castiglione |
| 2002/0038529 | A1 | 4/2002 | Nelson |
| 2005/0106360 | A1 | 5/2005 | Johnston |
| 2007/0139451 | A1 | 6/2007 | Somasiri |
| 2009/0242048 | A1 | 10/2009 | Sherman |
| 2017/0045285 | A1* | 2/2017 | Halverson .................. C08J 5/18 |

FOREIGN PATENT DOCUMENTS

| | | |
|---|---|---|
| JP | S61-46314 | 3/1986 |
| JP | 2003-307338 A2 | 10/2003 |
| JP | 2006187224 | 7/2006 |
| JP | 2016-131177 A | 7/2016 |
| WO | WO 2003-077639 | 9/2003 |
| WO | WO 2015/164468 A | 10/2015 |
| WO | WO 2015-164632 | 10/2015 |
| WO | WO 2018-116133 | 6/2018 |

* cited by examiner

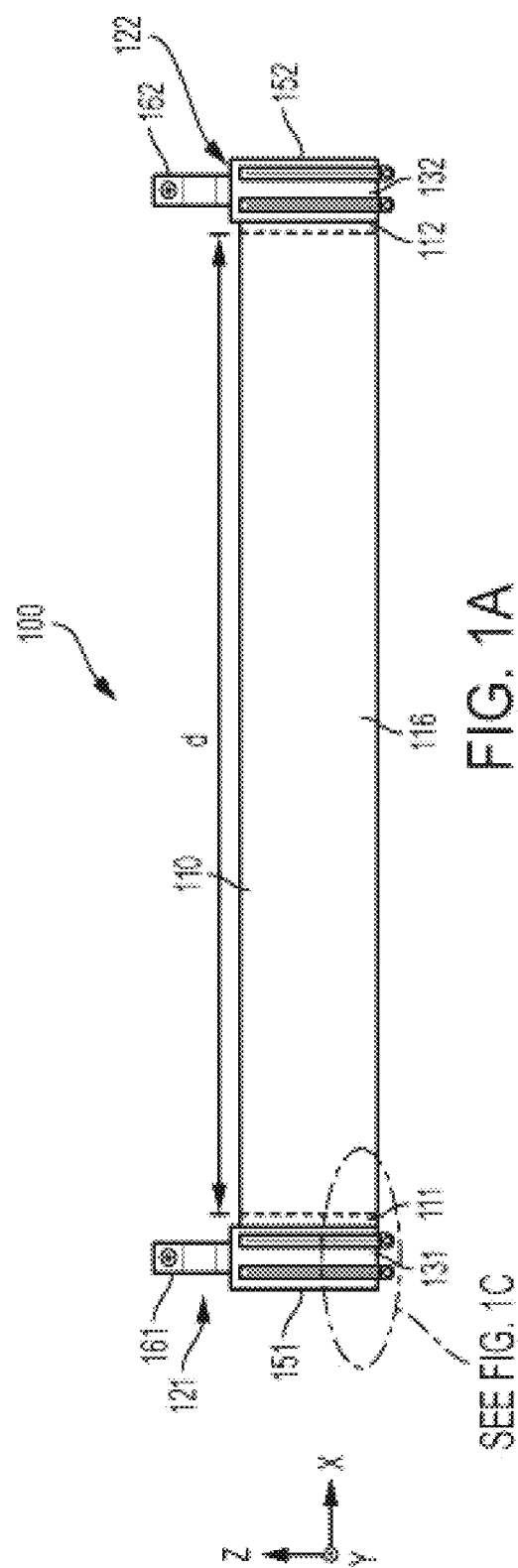

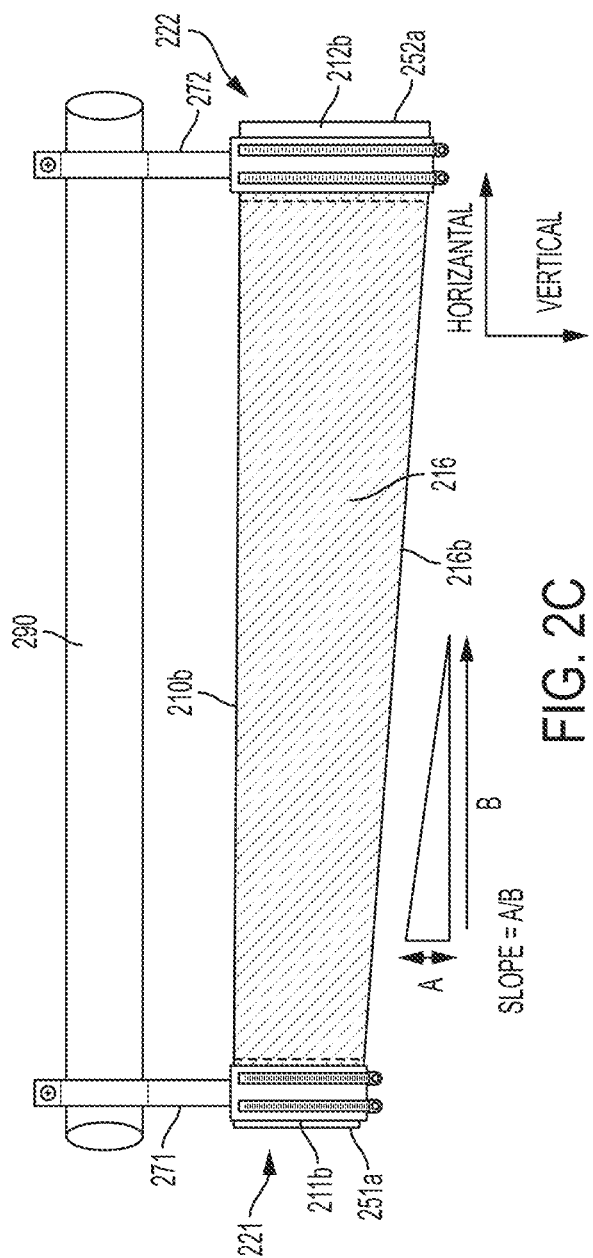

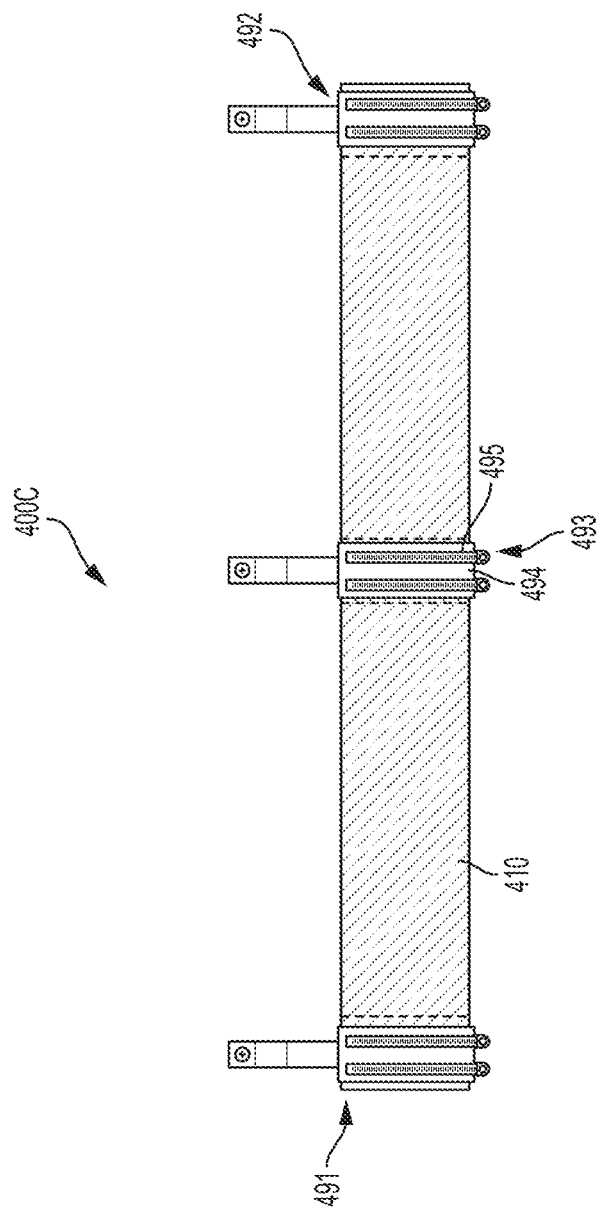

CONDENSATE MANAGEMENT SYSTEM

CROSS REFERENCE TO RELATED APPLICATIONS

This application is a national stage filing under 35 U.S.C. 371 of PCT/IB2017057494, filed Nov. 29, 2017, which claims the benefit of U.S. Provisional Application No. 62/430,295, filed Dec. 5, 2016, the disclosure of which is incorporated by reference in its entirety herein.

TECHNICAL FIELD

This application relates to condensate management systems and to devices and methods related to such systems.

BACKGROUND

Persistent condensation can be a problem within building infrastructure, causing water damage, mold or mildew-related contamination, safety hazards, and corrosion. A common source of condensation inside building infrastructure is "sweaty" pipes. Condensation is particularly troublesome in food processing facilities where the presence of moisture can lead to the proliferation of microorganisms. Droplets of condensation that form on and are released from condensate producing surfaces can transfer the microorganisms in the condensation to underlying processing equipment or food product. This microbiological contamination can lead to accelerated product spoilage or foodborne illness.

BRIEF SUMMARY

In accordance with some embodiments, a condensation management system includes an elongated flexible film configured to be stretched under tension between a first film support and a second film support. The film includes first and second ends that extend laterally across a width of the film. The film includes first and second sides that extend longitudinally between the first and second film ends. The film has a concave surface extending between the first and second sides and an opposing convex surface extending between the first and second sides. Microchannels are disposed in at least one of the concave surface and the convex surface. The microchannels induce a predetermined radius of curvature in the concave and convex surfaces of the film when the film is stretched longitudinally between the first and second film supports.

Some embodiments involve a condensation management system that includes a first film support and a second film support separated from the first support by a distance, d. An elongated flexible film is stretched under longitudinal tension between the first support and the second support. The film includes first and second ends extending laterally across a width of the film. The first end is supported by the first support and the second end is supported by the second support. The film includes first and second sides that extend longitudinally between the first and second ends. A concave surface of the film extends between the first and second sides and an opposing convex surface of the film extends between the first and second sides.

Some embodiments are directed to a condensation management device that includes an attachment portion comprising a curved attachment surface and a film retainer. The film retainer is configured to attach an end of an elongated flexible film to the curved attachment surface that is configured to impart a curvature in the flexible film. The curved attachment surface and film retainer are configured to operate together to secure the flexible film such that the film extends away from the attachment portion under tension. The condensate management device includes a mounting portion mechanically coupled to the attachment portion and configured to mount the condensation management device relative to a condensate-forming surface in an orientation so that condensate that forms on the condensate-forming surface falls onto a concave surface of the film.

These and other aspects of the present application will be apparent from the detailed description below. In no event, however, should the above summaries be construed as limitations on the claimed subject matter, which subject matter is defined solely by the attached claims.

BRIEF DESCRIPTION OF THE DRAWINGS

FIG. 1A is a side view of the condensate management system of FIG. 1A;

FIG. 2C is a diagram of a portion of a condensate management system that includes the trapezoidal film of FIG. 2B, the trapezoidal shape causing the bottom of the film to slope downward;

FIG. 4C depicts a condensate management system that includes one or more auxiliary supports disposed between the first and second film supports;

The figures are not necessarily to scale. Like numbers used in the figures refer to like components. However, it will be understood that the use of a number to refer to a component in a given figure is not intended to limit the component in another figure labeled with the same number.

DESCRIPTION OF ILLUSTRATIVE EMBODIMENTS

Figure 1B:
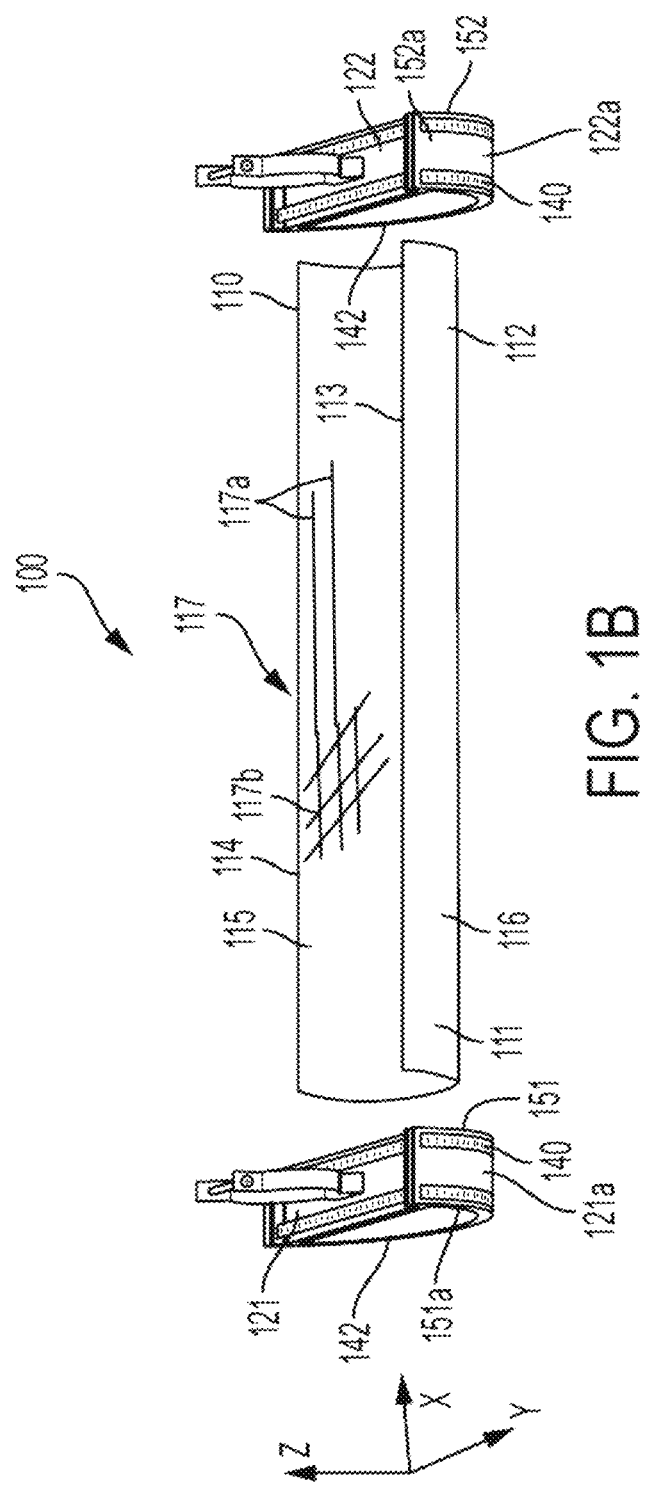
FIG. 1B is an exploded perspective view showing portions of a condensate management system in accordance with some embodiments.

Several approaches to manage condensation formed on overhead pipes in food processing facilities have previously been employed. One approach is to periodically dry the surface as condensation forms using an absorbent material such as a mop head attached to an extension pole. Given the continuous nature of the condensation and height of the surfaces, this approach is both time consuming and labor intensive. In addition, the mops quickly become saturated, requiring frequent changes. Bacterial contamination can be transferred laterally along the pipe by the mop head. A second approach is to physically remove condensation droplets using a rubber squeegee or compressed air. As with mopping, these practices are labor intensive and transfer potentially contaminated droplets to underlying surfaces. A third approach is to allow the condensation to form but to collect falling droplets in rigid metal drip pans suspended below the pipe. To maintain a hygienic environment the pans must be periodically removed, cleaned, and disinfected, which is also labor intensive and time consuming. Because of the requirements for cleaning and corrosion resistance, the pans must be fabricated out of a durable, non-corrosive material such as stainless steel. Stainless steel is both expensive and heavy, limiting the use of drip pans to short sections of pipe in critical locations.

Embodiments disclosed herein involve the use of flexible fluid control film to collect and transport condensate from condensate producing surfaces, such as pipes. According to some embodiments, these flexible films may be used in free span, only supported by end supports. According to some embodiments, the flexible fluid control films may be used with minimal or support structures disposed between the end supports used in free span secured between supports. Several problems arise when employing long, narrow sections of flexible film in free span to collect and transport condensate dripping from condensate producing surfaces. In scenarios wherein the condensate producing surfaces traverse long distances and are substantially horizontal, it may not be practical to impart the relatively large slope that induces spontaneous transport of individual droplets contacting the film. At shallower slope, water droplets accumulate until they coalesce and reach a mass sufficient to trigger spontaneous transport by gravity to the low end. This accumulating mass causes several issues when a flexible film is employed to transport the water. First, the load caused by accumulating water generates sag in the film. Too much sag will produce a low point of the film causing water to accumulate at the low point rather than be transported to the low end. Second, as the mass of water increases it is necessary to maintain a curvature in the film to prevent twisting under lateral load resulting in edge release of pooled water.

The issues outlined above present a materials challenge. A stiff film is desirable to minimize sag under load. However, a stiff film is predisposed to lie flat and it can be difficult maintain curvature over long distances between anchor points. On the other hand, an compliant film (easy to stretch) is able maintain curvature over long distances but can more easily sag under the weight of accumulating water prior to coalescence and transport of the water droplets.

Embodiments described herein involve using a flexible film to catch and transport fluid, such as condensate. The condensate management approaches described in this disclosure enhance the evaporation rate of water present on the film, decrease the phenomenon of water pooling, decrease the sag of the film, actively transport water to reduce the need for droplet coalescence, and/or induce curvature in the film due to microstructures in the film. Furthermore, the condensate management approaches described herein use flexible films that are lightweight, allowing collection of condensation over longer distances than metal drip pans. Condensation collected in a gutter formed by a flexible film can be routed to designated collection points. Sag can be reduced by evaporating and/or actively transporting water using microreplicated capillary channels on the surface of the film. Microreplicated features can also increase film curvature under tension, reducing the possibility that coalesced droplets of condensation drain off the side of the film. The fluid control films disclosed herein are inexpensive and thus can be discarded and replaced rather than cleaned, saving labor and improving hygiene within the food processing environment.

FIG. 1A is an exploded perspective view and FIG. 1B is a side view showing portions of a condensate management system 100 in accordance with some embodiments. The condensate management system 100 includes an elongated flexible film 110 stretched between and supported by a first support 121 and a second support 122. As indicated in FIG. 1B, the first and second supports 121, 122 are separated from each other by a distance, d. The flexible film 110 includes a first end region 111 and a second end region 112, each end region 111, 112 extending laterally across the film 110 along the y direction shown in FIGS. 1A and 1B. The flexible film 110 includes first 113 and second 114 sides that extend longitudinally between the first 111 and second 112 end regions along the x direction in FIGS. 1A and 1B. In some embodiments, the flexible film 110 is supported only by the first and second supports 121, 122 wherein the first support 121 supports the first end region 111 of the flexible film 110 and the second support 122 supports the second end region 112 of the film 110. In some embodiments, the flexible film 110 is longitudinally tensioned in a free span between the first and second supports 121, 122. The width of the film 110 across the lateral y-axis may be may be greater than about 5 cm and less than about 50 cm, for example. The length of the film 110 along the longitudinal x-axis may be greater than about 100 cm and less than about 1500 cm, for example. The ratio of the film width to the film length may be greater than about 0.0033 and less than about 0.5 for example. The longitudinal tension in the film may be in a range of about 2.5 pounds to about 20 pounds, for example.

In some embodiments, the flexible film 110 includes microchannels 117 disposed on one or both surfaces 115, 116 of the film 110. In some embodiments, the longitudinal axes of the channels 117a may be substantially parallel to a longitudinal axis of the film 110. In some embodiments, the longitudinal axes of the channels 117b may lie along a non-zero angle with respect to the longitudinal axis of the film 110. In some embodiments, the film 110 may include both channels 117a that lie along the longitudinal film axis and channels 117b that are angled with respect to the longitudinal film axis. The microchannels may be configured to provide capillary wicking of condensate that falls on the film. In some embodiments, the microchannels 117 may provide wicking in opposition to the force of gravity. In some embodiments, the channels may induce a predetermined lateral curvature of the film 110.

Each support 121, 122 includes an attachment portion 151, 152 having a curved attachment surface 151a, 152a. As illustrated in FIG. 1A, each support 121, 122 includes a film retainer 131, 132 that attaches the end regions 111, 112 of the film 110 to the attachment component 151, 152 of the support 121, 122. The first end region 111 of the film is attached to the attachment surface 151a of the first support 121 by a first film retainer 131 and the second end region 112 of the film 110 is attached to the attachment surface 152a of the second support 122 by a second film retainer 132. The first and second film retainers 131, 132 have about the same radius of curvature as the curved attachment surfaces 151a, 152a of the film supports 121, 122. As illustrated in the cross sectional detail diagram of FIG. 1C, the first end region 111 of the film 110 is sandwiched between a curved attachment surface 151a of the first support 121 and the first film retainer 131. Similarly, the second end region 112 of the film 110 is sandwiched between a curved attachment surface 152a of the second support 122 and the second film retainer 132. In some embodiments, the first and second film retainers 131, 132 flexibly conform to the attachment surfaces 151a, 152a of the supports 121, 122. For example, in some implementations each film retainers 131, 132 may comprise a band 142, strap, or clip that can be tightened around the support 121, 122. In some implementations the band 142 or strap may align with a recess 140 in the support 121, 122. It may be challenging to "grip" the film when the channel side has a low contact area. A recess 140 in the support 121, 122 that is slightly wider than the band 142 or strap allows the band 142 or strap to "pinch" the film tighter. This forces the film to have two right angles which helps minimize slipping when tensioned.

In some embodiments, the film retainers may be clips that attach to the film supports and secure the film to the film support by spring force. In some embodiments, the film retainers are configured so that at least one end of the film retainers can be quickly disengaged from the attachment portion of the film support to allow for expeditious replacement of the fluid control films.

Figure 1C:
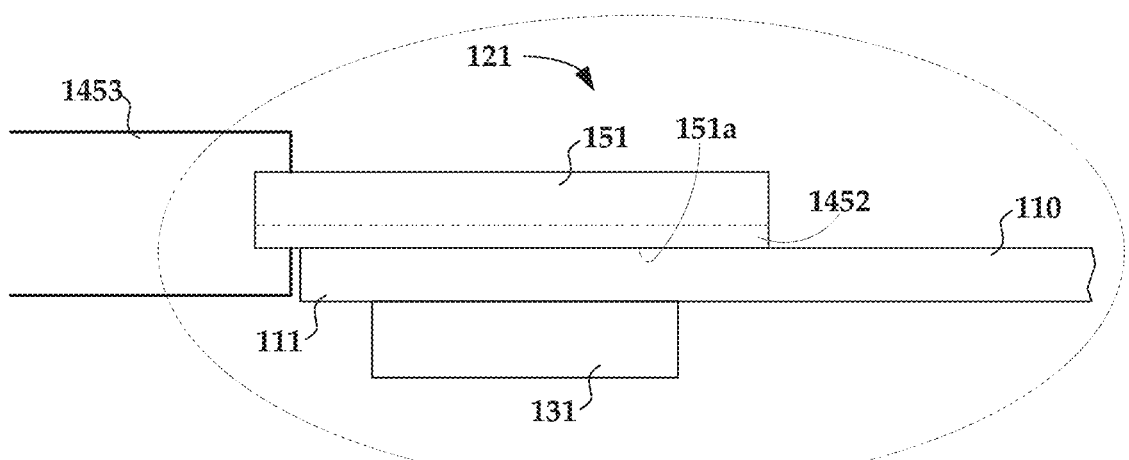
FIG. 1C is a cross sectional detail of the first end region of the film shown in FIGS. 1A and 1B.
Figure 2A:
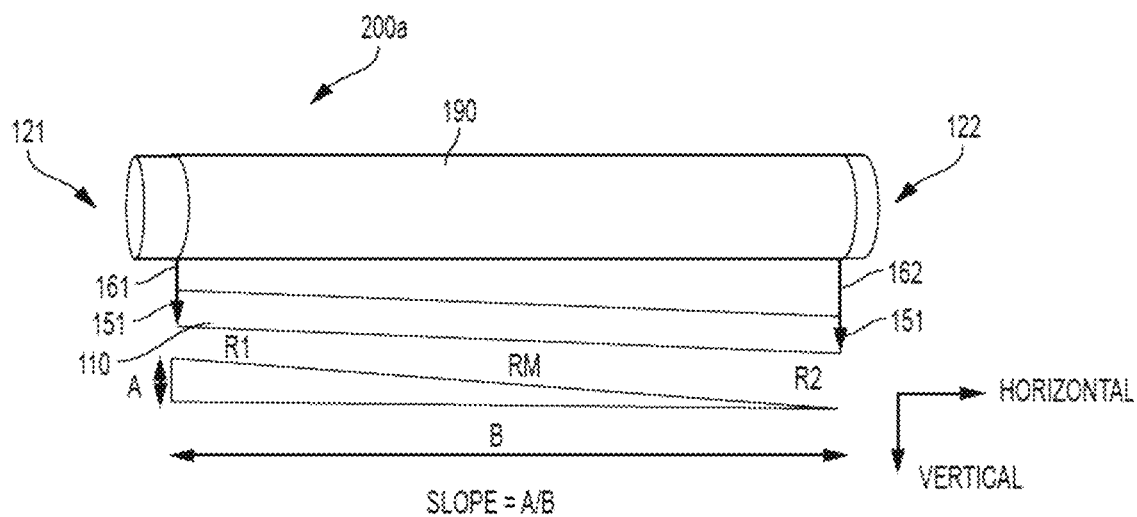
FIG. 2A shows a condensate management system mounted relative to a condensate producing structure so that the longitudinal axis of the flexible film is angled downward along the direction of the force of gravity in accordance with some embodiments.

The film supports 121, 122 also include a mount 161, 162 that attaches the film support 121, 122 to a structure such that the film 110 is oriented to catch falling condensate. In some embodiments, the mount 161, 162 attaches the film support 121, 122 to the condensate producing structure, such as a pipe. The mount can also be attached to structures used to support the pipe. For example, larger pipes are often laid on top of angle iron supports running 90 degrees to the pipe direction rather than "hung" from the ceiling. In some scenarios, the film support may be mounted to the pipe support as opposed to directly to the pipe. This arrangement can be advantageous when the pipe is coated with insulation, to avoid "crushing" the insulation when tightening a support directly on the pipe. As indicated in FIG. 1B and FIG. 2A, one of the mounts 162 may be longer than the other mount 161 to provide a predetermined slope to the film 110. In the example of FIGS. 1A-1C, the first and second sides 113, 114 of the flexible film 110 are free between the first end region 111 and the second end region 112.

Figure 1D:
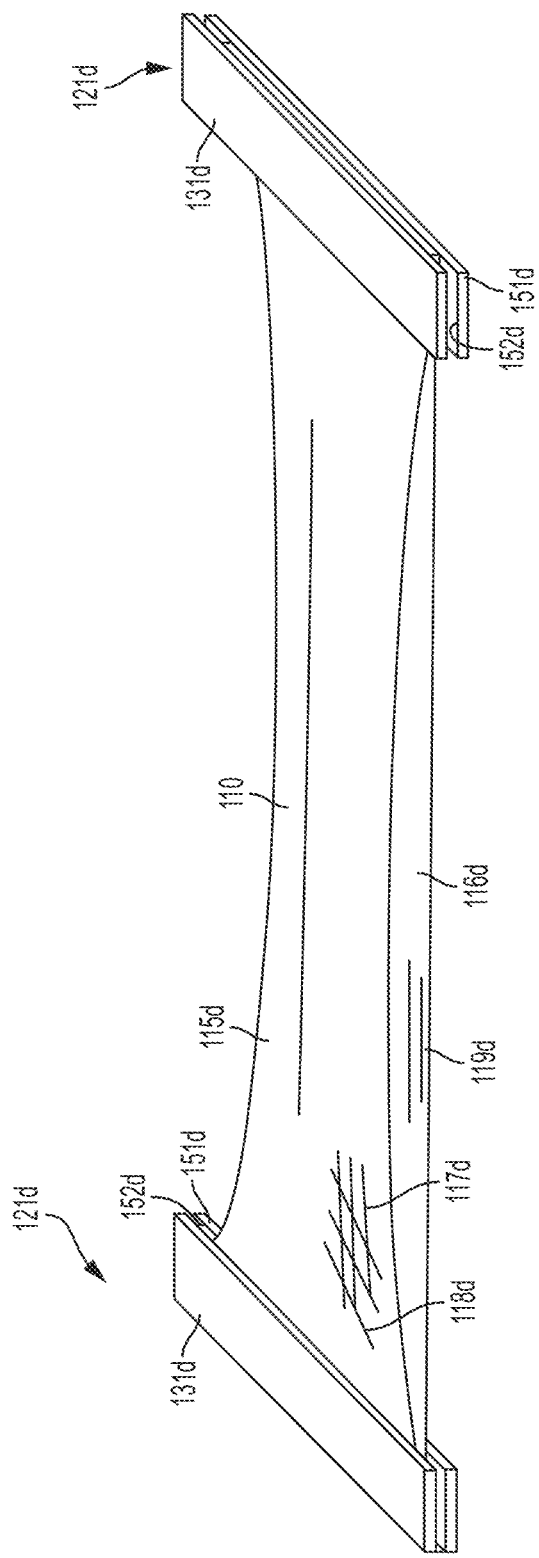
FIG. 1D is a perspective view of portions of a condensate management system wherein the attachment surfaces of the film supports are substantially flat in accordance with some embodiments.

According to some embodiments, the attachment surfaces 152d of the attachment portions 151d of the film support 121d may be substantially flat as illustrated in FIG. 1D. Despite the flat attachment surfaces 152d, the film 110 may still have a curvature when the film 110 includes microchannels 117d, 118d, 119d, disposed on one or both of the concave 115d and convex surfaces 116d of the film 110 when is held under longitudinal tension. At either end, the film 110 is clamped between the flat attachment surface 152d and the film retainer 131.

As best seen in FIG. 2A, a condensate management system 200a may be mounted relative to a condensate producing structure 190, such as a pipe, so that the longitudinal axis of the flexible film 110 is angled downward, where the downward direction is the direction of the force of gravity along the vertical axis indicated in FIG. 2A. The slope of the longitudinal axis of the film 110 may depend on the length of the pipe and the physical structure of the room or enclosure in which the pipe is located. For example, over a distance of B along the horizontal axis, the film may drop by a distance A along the vertical axis. A film with longitudinal capillary channels can transport liquid at a much lower slope than a film without longitudinal channels. Therefore, films with longitudinal channels may be arranged to have a smaller slope than films having angled channels. In some embodiments, the slope of the film A/B may be in a range of about 0.01 to about 0.2.

Figure 2B:
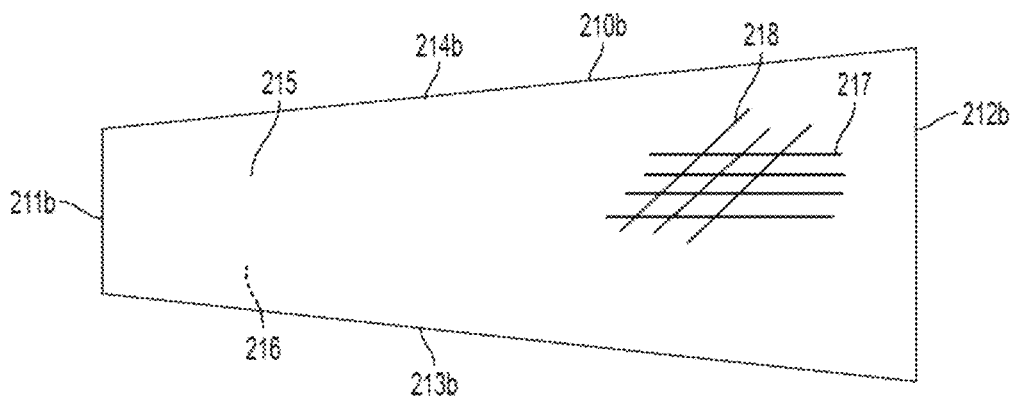
FIG. 2B illustrates a flexible film used for condensate management that has a trapezoidal shape in accordance with some embodiments.

In some embodiments, the shape of the film may be used to create a slope in the film. Referring now to FIGS. 2B and 2C, in some embodiments, a flexible film 210a used for condensate management may have a trapezoidal shape such that one end 212b of the film is longer than another end 211b of the film and the sides 213b, 214b of the film are not parallel. As previously discussed, the film 210b may include one or more sets 217, 218 of channels disposed on one or both surfaces 215, 216 of the film 210b.

In some embodiments, film supports may not be used and the film may be attached to a mount via attachment features, such as holes disposed in the film corners. The mounts attached to the attachment features of the film tension the film only on the sides and not along the entire radius of a support.

FIG. 2C illustrates the film 210b of FIG. 2B after it is curved and tensioned between first and second film supports 221, 222. The curved attachment surface 252a of the film support 222 at the second end 212b of the film 210b is longer along the vertical axis than the curved attachment surface 251a of the film support 221 at the first end 211b of the film 210b. The longer attachment surface 252a accommodates the longer end portion 212b. In this embodiment, the extension portions 271, 272 of the film supports 221, 222 may be the same length such that when attached to a pipe 290 that extends substantially parallel with the horizontal axis, the trapezoidal shape of the film 210b causes the bottom 216b of the convex surface 216 of the film 210b to slope downward along the direction of the force of gravity (shown as the vertical axis in FIG. 2C).

Figure 3:
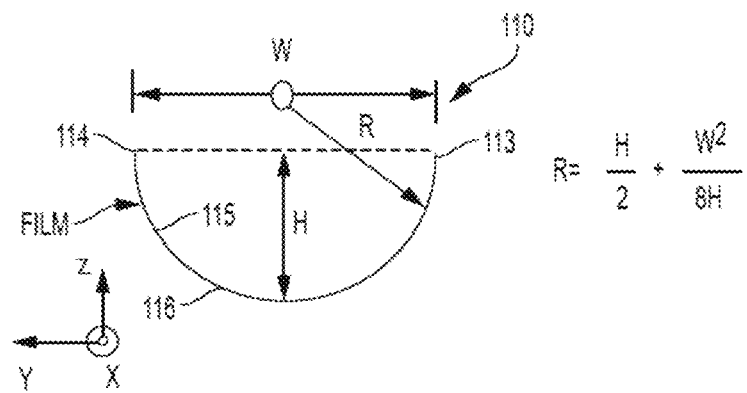
FIG. 3 is lateral cross section of a flexible film that is curved laterally along the y-axis in accordance with some embodiments.

As best seen in the lateral cross section of the film 110 shown in FIG. 3, the flexible film 110 is curved laterally along the y-axis. The curvature of the film 110 forms a first concave surface 115 extending between the first 113 and second 114 sides and an opposing convex surface 116 extending between the first 113 and second 114 sides. When supported and tensioned as described herein, the film 110 has a radius of curvature R, which can be calculated based on the distance, W, between the sides 113, 114 of the curved film 110, and the height, H, of the curved film 110. As shown in FIG. 3, the height of the film is measured as the distance between the lowest point of the film 110 to the top of the sides 113, 114 of the film 110. In some scenarios, the radius of curvature of the film 110 may be a function of the distance, d, between the supports 121, 122. The film 100 may have an average radius of curvature between about 3 cm to about 10 cm, for example.

For example, as indicated in FIG. 2A, the film 110 may have a first radius of curvature, $R_1$, proximate to the first support 121; a second radius of curvature, $R_2$, different from the $R_1$, proximate to the second support; and a third radius of curvature $R_m$, different from $R_1$ and $R_2$, at an intermediate point between the first and second supports 121, 122, e.g., at the midpoint of the film 110. The first radius of curvature, $R_1$, is dependent on the curvature of the attachment area of the first support 121a and the second radius of curvature, $R_2$, is dependent on the curvature of the attachment area of the second support. The curvature of the attachment areas of the first and second supports may be the same or may be different.

In some embodiments, e.g., where the attachment surfaces of the film supports are flat or slightly curved, the first and/or second radius of curvature $R_1$, $R_2$ may be the maximum radius of curvature of the film and the third radius of curvature, Rm, may be the minimum radius of curvature that occurs due to curvature of the sides induced by the microchannels and tension in the film.

In some embodiments, e.g., where the attachment surfaces of the film supports are curved, the first and/or second radius of curvature $R_1$, $R_2$ may be the minimum radius of curvature of the film and the third radius of curvature, Rm, may be the maximum radius of curvature that occurs due to lateral sagging of the sides. For example, in some embodiments the maximum value of the radius of curvature of the film may be less than about 2 times or less than about 5 times the radius of curvature of the curved attachment surfaces of the first and second supports.

Lateral sagging causes the sides 113, 114 of the film 110 to move apart, increasing the distance, W, between the sides 113, 114 of the film and the increasing the radius of curvature of the film. The radius of curvature of the film 110 at the supports 121, 122 is substantially the same as the radius of curvature of the curved attachment areas 121a, 122a of the supports 121, 122. The radius of curvature of the film 110 at locations spaced apart from the supports 121, 122 is a function of the stiffness of the film, the tension of the film, and the configuration and orientation of channels disposed in one or both film surfaces. For example, the radius of curvature of the film can be increased using a stiffer film when compared to a more flexible film. However, the ease of installation and maintenance aspects of more flexible films can be useful in many applications. Thus, the presence of channels in the concave and/or convex surfaces of the film can be can be used to decrease radius of curvature and to maintain a desired amount of film flexibility. According to some embodiments, the radius of curvature of a flexible film that includes channels is less than the lateral sag of an identical flexible film without the channels, as illustrated by experiments performed and reported on in the examples section below.

The channels may be designed to cause a flexible film of a predetermined stiffness to have a predetermined radius of curvature when the film is placed under tension by being stretched between the first and second supports separated by a predetermined distance. The channels in the film may additionally or alternatively be configured to facilitate movement of condensate that falls or forms on the film, wherein the movement of the condensate may be along the direction of the force of gravity and/or by capillary action in opposition to the force of gravity.

According to some implementations, channels may be disposed on one or both of the concave and/or convex surfaces of the film. In some embodiments, the longitudinal axes of the channels are arranged to be substantially parallel to a longitudinal axis of the flexible film. In some embodiments, the channels may be angled, meaning that the longitudinal axes of the channels are disposed at an angle to the longitudinal axis of the film. In some embodiments, the concave and/or convex surface of the film may include some channels that run substantially parallel to the longitudinal axis of the film and some channels that are angled with respect to the longitudinal axis of the film. Only one of the concave and convex surfaces may include channels. In some implementations, both the concave and convex surfaces of the film may include channels. For example, the concave surface may include angled channels and the convex surface may include longitudinal channels. The channels on one surface of the film may be designed to provide a first characteristic, e.g., a specified radius of curvature, and channels on the opposing surface of the film may be designed to provide a second characteristic, e.g., a specified capillary capacity.

Figure 4A:
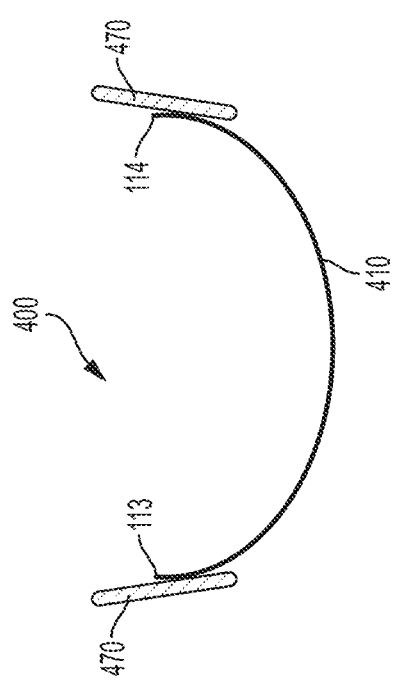
FIGS. 4A and 4B respectively show cross sectional and side views of a condensate management system that includes a frame comprising two frame portions configured to at least partially support the two sides of the film in accordance with some embodiments.
Figure 4B:
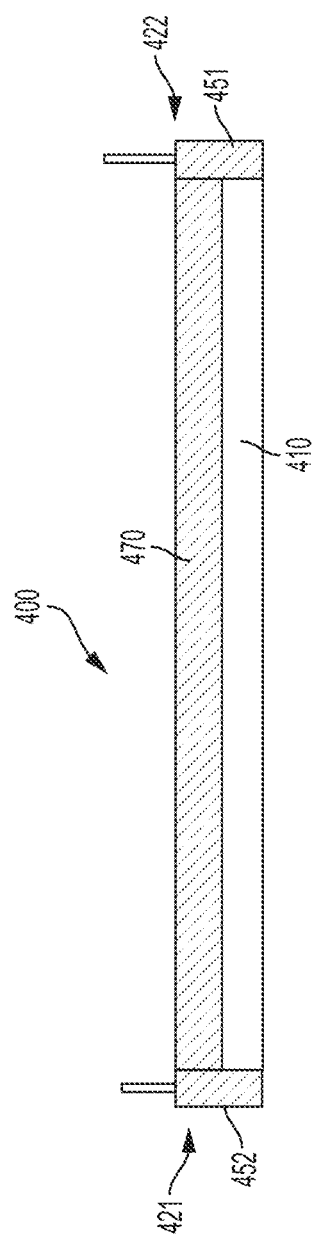

As discussed above, in some embodiments the flexible film may be tensioned in free span between the film supports. Alternatively, a condensate management system may include a frame that at least partially supports the film. FIGS. 4A and 4B show cross sectional and side views of a condensate management system 400 that includes a frame comprising two frame portions 471, 472 configured to at least partially support the two sides 113, 114 of the film. In the condensate management system 400 of FIG. 4A, the frame portions 471, 472 extend between the film supports 421, 422 and are attached to the attachment portions 451, 452 of the film supports.

Turning now to FIG. 4C, in some embodiments a condensate management system 400c includes one or more auxiliary supports 493 disposed between the first 491 and second 492 film supports. The auxiliary supports 493 may be similar to the film supports 491, 492 except that the auxiliary support 493 does not tension the film 410. The film retainer 494 and the curved attachment surface 495 of the auxiliary film support 493 may be configured to provide support for the bottom and/or sides of the film 410 without applying sufficient gripping force to the film 410 that would allow the film 410 to be tensioned by the auxiliary support 493.

In a retrofit scenario, for processing plants that already include rigid gutters, e.g., metal gutters, the flexible films described herein may be used in conjunction with the rigid gutters. For example, the flexible film may be disposed within the gutter so that in some cases the rigid gutter provides support to the sides and/or bottom of the film. According to some embodiments, the flexible film may be tensioned along the gutter by film supports. Alternatively, in some embodiments, the flexible film may be disposed within the gutter without tensioning to provide for evaporation of the condensate and to facilitate cleaning the gutter by removing and replacing the flexible film.

Figure 5A:
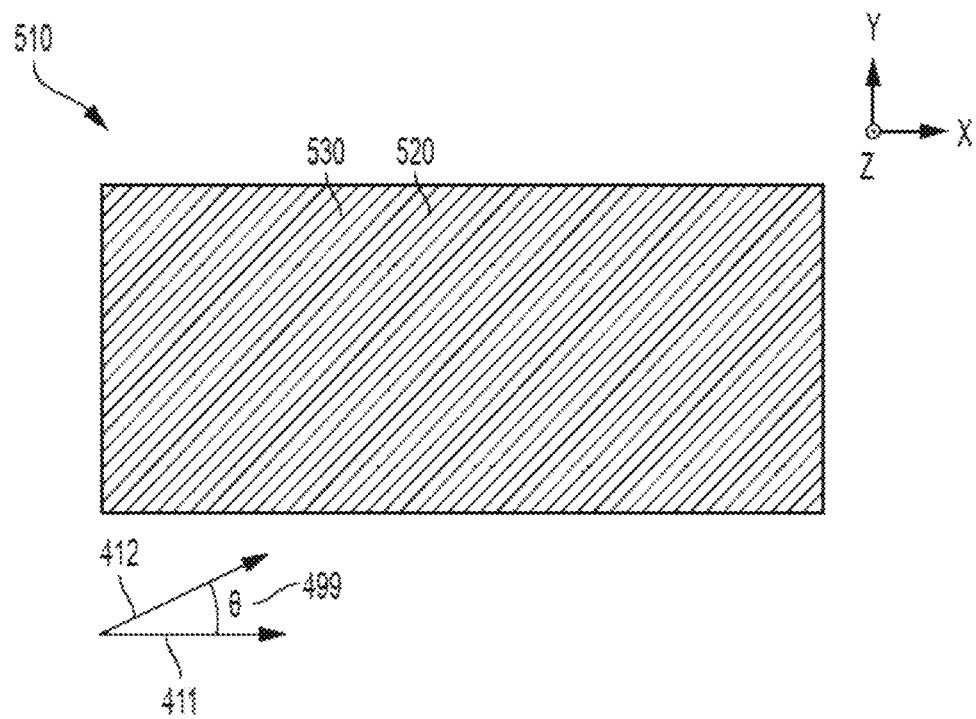
FIG. 5A illustrates a flexible film that is laid flat, the flexible film having channels that extend across at least one surface of the film in accordance with some embodiments.
Figure 5B:
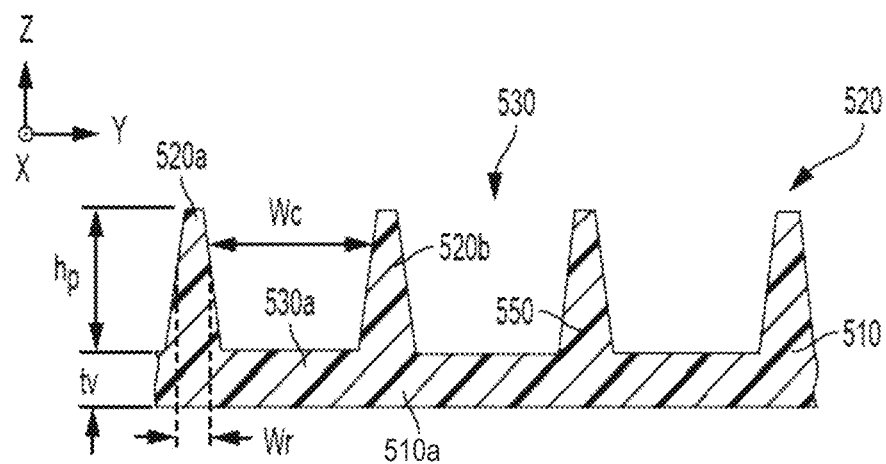
FIG. 5B is a cross sectional view of the film of FIG. 5A.

FIG. 5A illustrates a flexible film 510 that is laid flat, the flexible film 510 having channels 530 that extend across at least one surface of the film 510 in accordance with some embodiments. As illustrated in the cross sectional diagram of FIG. 5B, the edges of the channels 530 rise along the z-axis above the base 530a of the film 510 to form the channels 530, with each channel 430 having a ridge 520 on either side running along the channel longitudinal axis 512. In FIG. 5B, the ridges 520 are shown rising along the z-axis substantially perpendicular to the base 530a of the channel 530. Alternatively, in some embodiments, the ridges can extend at a non-perpendicular angle with respect to the base of the channel. As illustrated in FIG. 5A, the first and second primary ridges 520 of the channel have a height, $h_p$ that is measured from the bottom base surface 530a of the channel 530 to the top surface 520a of the ridges 520. The ridge height $h_p$ may be selected to provide durability and protection to the film 410. In some embodiments, the ridge height $h_p$ is about 25 µm to about 3000 µm, or about 100 µm to about 200 µm, the cross sectional channel width, $w_c$, is about 25 µm to about 3000 µm, and the cross sectional ridge width, $w_r$, is about 30 µm to about 250 µm.

In some embodiments, as shown in FIG. 5B, the side surfaces 520b of the channels 530 may be sloped in cross section so that the width of the ridge at the base surface 530a of the channel 530 is greater than the width of the ridge at the top surface 520a of the ridges 520. In this scenario, the width of the channel 530 at the base 530a of the channel 530 is less than the width of the channel 530 at the top surface 520a of the ridges 520. Alternatively, the side surfaces of the channels could be sloped so that the channel width at the bottom surface of the channel is greater than the channel width at the top surface of the ridges.

The distance, $t_v$, between the base surface 530a of the channel 530 and the opposing surface 510a of the film 510 can be selected to allow liquid droplets to be wicked by the film 510 but still maintain a robust structure. In some embodiments, the thickness $t_v$ is less than about 75 µm thick, or between about 20 µm to about 200 µm. In some embodiments, hydrophilic surface structure or coating 550 may be disposed, e.g., coated or plasma deposited, on the base 530a, channel sides 520b, and channel tops 520a in some embodiments.

In some embodiments, each set of adjacent ridges 520 are equally spaced apart. In other embodiments, the spacing of the adjacent ridges 520 may be at least two different distances apart. According to some embodiments, the longitudinal axis 512 of the channels 530 intersects with the longitudinal axis 511 of the film 410 to make a channel angle 499. The angle 599 may be greater than 0 degrees and less than about 90 degrees, or greater than 0 degrees and less than about 60 degrees for example. A channel angle 599 of zero would result in the longitudinal axis of the channels 530 being about parallel to the longitudinal axis of the film. In some embodiments, the channel angle 599 is less than about 45 degrees. In some embodiments, the channel angle 599 is between about 5 degrees and about 30 degrees, or about 5 degrees to about 20 degrees or about 10 degrees to about 15 degrees. In some embodiments, the channel angle 599 is about 20 degrees.

According to some embodiments, the channels 530 are configured to provide capillary movement of fluid in the channels 530 and across the flexible film 510. The capillary action wicks the fluid to disperse it across the film 510 so as to increase the surface to volume ratio of the fluid and enable more rapid evaporation. The channel cross-section, channel surface energy, and fluid surface tension determine the capillary force. Additionally or alternatively, according to some embodiments, the channels 530 are configured to provide and maintain a pre-determined radius of curvature of the film 510 when the film is stretched between supports under tension.

Figure 6:
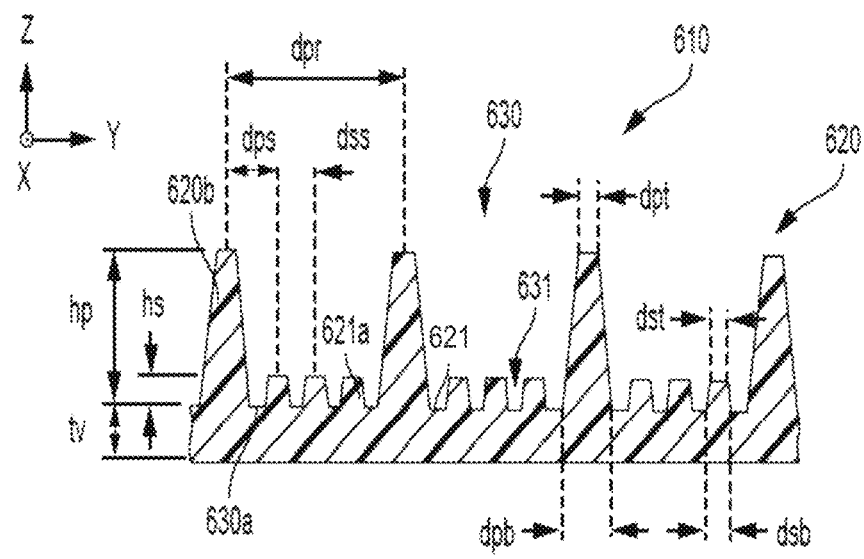
FIG. 6 is a cross sectional view of a flexible film having primary and secondary channels according to an example embodiment.

FIG. 6 is a cross sectional view of a flexible film 610 having primary 630 and secondary 631 channels according to an example embodiment. The primary and secondary channels 630, 631 are defined by primary and secondary ridges 620, 621, wherein the channels 630, 631 and ridges 620, 621 run along a channel axis that makes an angle, θ, with respect to the longitudinal axis of the film 610, e.g., the x-axis as previously discussed in connection with FIG. 5A. Each primary channel 630 is defined by a set of primary ridges 620 (first and second) on either side of the primary channel 630. The primary ridges 620 have a height $h_p$ that is measured from the base surface 630a of the channel 630 to the top surface 620a of the ridges 620.

In some embodiments, microstructures are disposed within the primary channels 630. In some embodiments, the microstructures comprise secondary channels 631 disposed between the first and secondary primary ridges 620 of the primary channels 630. Each of the secondary channels 631 is associated with at least one secondary ridge 621. The secondary channels 631 may be located between a set of secondary ridges 621 or between a secondary ridge 621 and a primary ridge 620.

The center-to-center distance between the primary ridges, $d_{pr}$, may be in a range of about 25 µm to about 3000 µm; the center-to-center distance between a primary ridge and the closest secondary ridge, $d_{ps}$, may be in a range of about 5 µm to about 350 µm; the center-to-center distance between two secondary ridges, $d_{ss}$, may be in a range of about 5 µm to about 350 µm. In some cases, the primary and/or secondary ridges may taper with distance from the base. The distance between external surfaces of a primary ridge at the base, $d_{pb}$, may be in a range of about 15 µm to about 250 µm and may taper to a smaller distance of $d_{pt}$ in a range of about 1 µm to about 25 µm. The distance between external surfaces of a secondary ridge at the base, $d_{sb}$, may be in a range of about 15 µm to about 250 µm and may taper to a smaller distance of $d_{st}$ in a range of about 1 µm to about 25 µm. In one example, $d_{pp}$=0.00898 inches (228 µm), $d_{ps}$=0.00264 inches (67 µm), $d_{ss}$=0.00185 inches (47 µm), $d_{pb}$=0.00251 inches (64 µm), $d_{pt}$=0.00100 inches (25.4 µm), $d_{sb}$=0.00131 inches (33.3 µm), $d_{st}$=0.00100 inches (25.4 µm), $h_p$=0.00784 inches (200 µm), and $h_s$=0.00160 inches (40.6 µm).

The secondary ridges have height $h_s$ that is measured from the base surface 530a of the channel 630 to the top surface 621a of the secondary ridges 621. The height $h_p$ of the primary ridges 620 may be greater than the height $h_s$ of the secondary ridges 621. In some embodiments the height of the primary ridges is between about 25 µm to about 3000 µm or between about 100 µm to about 200 µm and the height of the secondary ridges is between about 5 µm to about 350 µm, or between about 20 µm to about 50 µm. In some embodiments, a ratio of the secondary ridge 621 height $h_s$ to the primary ridge 620 height $h_p$ is about 1:5. In some embodiments, $h_s$ is less than half of $h_p$. The primary ridges 620 can be designed to provide durability to the film 610 as well as protection to the secondary channels 631, secondary ridges and/or or other microstructures disposed between the primary ridges 620. The flexible film 610 is configured to disperse fluid across the surface of the film 6610 to facilitate evaporation of the fluid.

Figure 7:
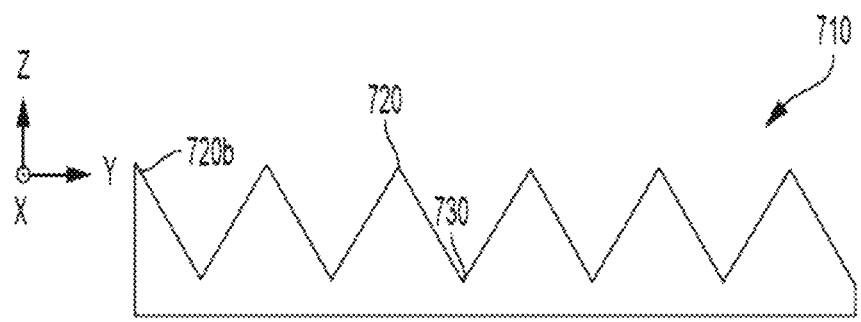
FIG. 7 illustrates a cross section of a condensate control film with ridges and channels according to an example embodiment.

FIG. 7 illustrates a cross section of a condensate control film 710 with ridges and channels according to an example embodiment. The film 710 includes channels 730 that are v-shaped with ridges 720 that define the channels 730. In this embodiment, the side surfaces 720b of the channels are disposed at an angle with respect to the axis normal to the layer surface, i.e., the z-axis in FIG. 7. As previously discussed, the channels 730 and ridges 720 of the film 710 run along a channel axis that makes an angle, θ, with respect to the longitudinal axis of the film 710, e.g., the x-axis as previously discussed in connection with FIG. 5A. The ridges 720 may be equal distance apart from one another.

The channels described herein may be replicated in a predetermined pattern that form a series of individual open capillary channels that extending along one or both major surfaces of the film. These microreplicated channels formed in sheets or films are generally uniform and regular along substantially each channel length, for example from channel to channel. The film or sheet may be thin, flexible, cost effective to produce, can be formed to possess desired material properties for its intended application The flexible films discussed herein are capable of spontaneously transporting fluids along the channels by capillary action. Two general factors that influence the ability of fluid control films to spontaneously transport fluids are (i) the geometry or topography of the surface (capillarity, size and shape of the channels) and (ii) the nature of the film surface (e.g., surface energy). To achieve the desired amount of fluid transport capability the designer may adjust the structure or topography of the fluid control film and/or adjust the surface energy of the fluid control film surface. In order for a channel to function for fluid transport by spontaneous wicking by capillary action, the channel is generally sufficiently hydrophilic to allow the fluid to wet the surfaces of the channel with a contact angle between the fluid and the surface of the fluid control film equal or less than 90 degrees.

In some implementations, the fluid control films described herein can be prepared using an extrusion embossing process that allows continuous and/or roll-to-roll film fabrication. According to one suitable process, a flowable material is continuously brought into line contact with a molding surface of a molding tool. The molding tool includes an embossing pattern cut into the surface of the tool, the embossing pattern being the microchannel pattern of the fluid control film in negative relief. A plurality of microchannels is formed in the flowable material by the molding tool. The flowable material is solidified to form an elongated fluid control film that has a length along a longitudinal axis and a width, the length being greater than the width. The microchannels can be formed along a channel longitudinal axis that makes an angle that is greater than 0 and less than 90 degrees with respect to the longitudinal axis of the film. In some embodiments, the angle is less than 45 degrees, for example.

The flowable material may be extruded from a die directly onto the surface of the molding tool such that flowable material is brought into line contact with the surface of molding tool. The flowable material may comprise, for example, various photocurable, thermally curable, and thermoplastic resin compositions. The line contact is defined by the upstream edge of the resin and moves relative to both molding tool and the flowable material as molding tool rotates. The resulting fluid control film may be a single layer article that can be taken up on a roll to yield the article in the form of a roll good. In some implementations, the fabrication process can further include treatment of the surface of the fluid control film that bears the microchannels, such as plasma deposition of a hydrophilic coating as disclosed herein. In some implementations, the molding tool may be a roll or belt and forms a nip along with an opposing roller. The nip between the molding tool and opposing roller assists in forcing the flowable material into the molding pattern. The spacing of the gap forming the nip can be adjusted to assist in the formation of a predetermined thickness of the fluid control film. Additional information about suitable fabrication processes for the disclosed fluid control films are described in commonly owned U.S. Pat. Nos. 6,375,871 and 6,372,323, each of which is incorporated by reference herein in its respective entirety.

Figure 8A:
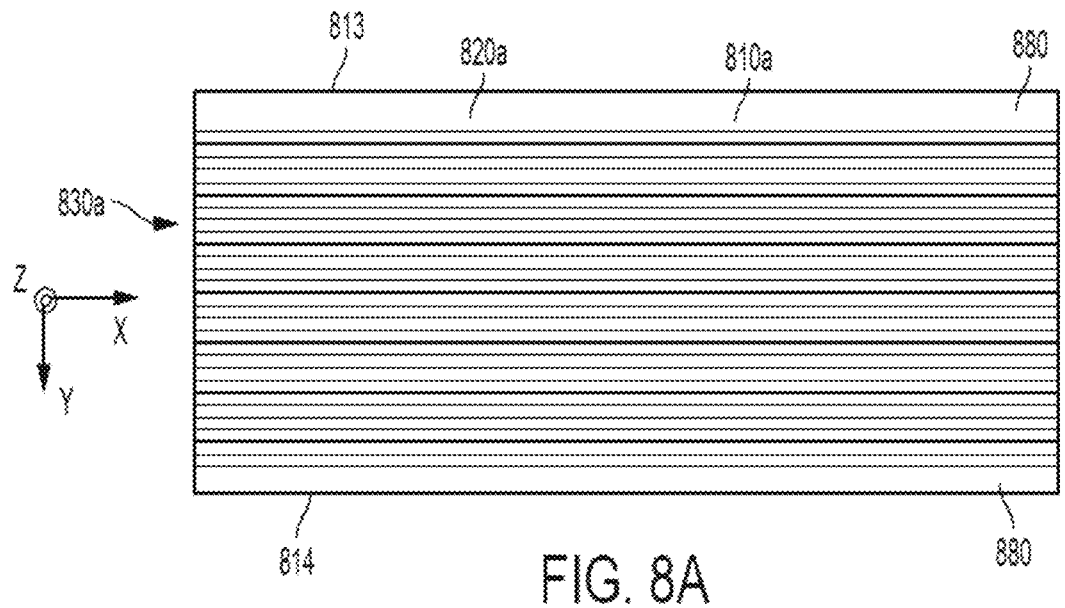
FIGS. 8A though 8C are conceptual diagrams of fluid control films in accordance with various embodiments.

The films may be formed with channels arranged in a variety of patterns. FIGS. 8A though 8C are conceptual diagrams of fluid control films in accordance with various embodiments. FIG. 8D shows a micrograph of a portion of a film having channels arranged as depicted in FIG. 8A. FIG. 8A shows a film 810a with major 830a and minor 820a channels disposed within the major channels 830a. The major channels 830a and the minor channels 820a are oriented such that the longitudinal axis of the channels 830a, 820a is substantially parallel to the longitudinal axis of the film 810a.

Figure 8B:
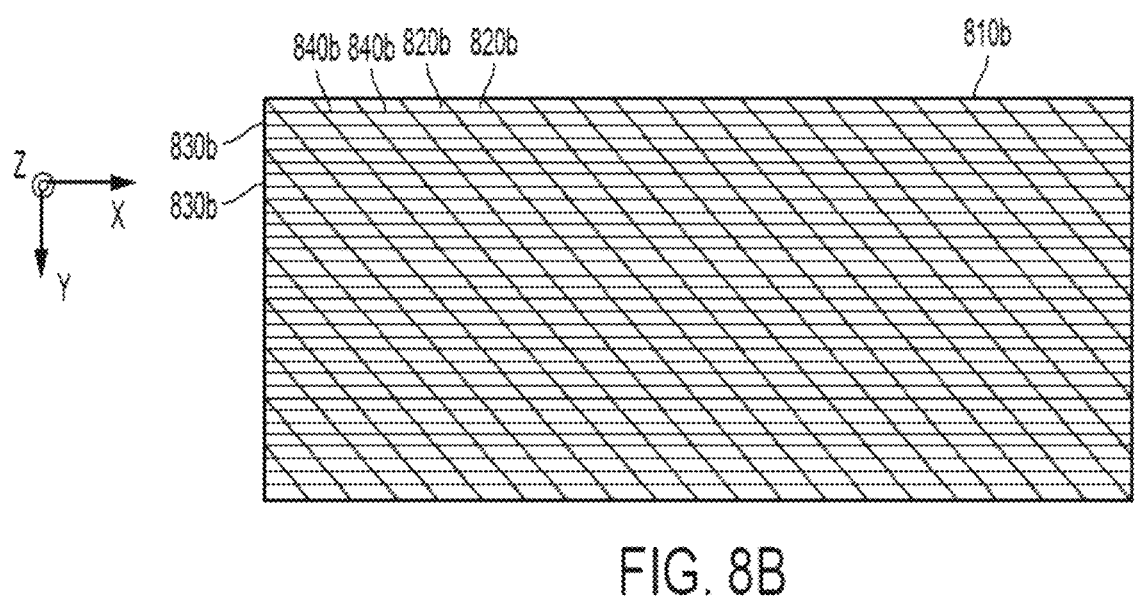
FIG. 8D shows a micrograph of a portion of a film having channels arranged as depicted in FIG. 8A.

FIG. 8B illustrates a film 810a having three sets of channels, first major channels 830b, second major channels 840b, and minor channels 820b. Two or more of the three sets of channels 830b, 840b, 820b may be in fluid communication with each other. The longitudinal axes of the first major channels 830b and the minor channels 820b are substantially aligned with the longitudinal axis of the film 810b. The minor channels 820b are disposed within the first major channels 830b as previously discussed in connection with FIG. 8A. The longitudinal axes of the second major channels 840b are angled with respect to the longitudinal axis of the film 810a.

Figure 8C:
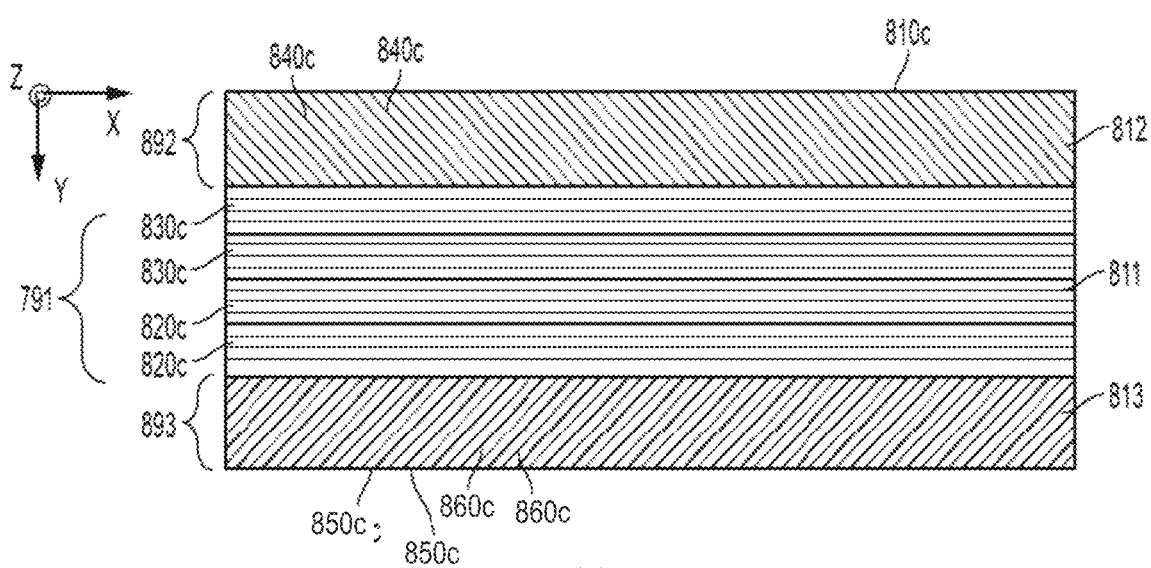
Figure 8D:
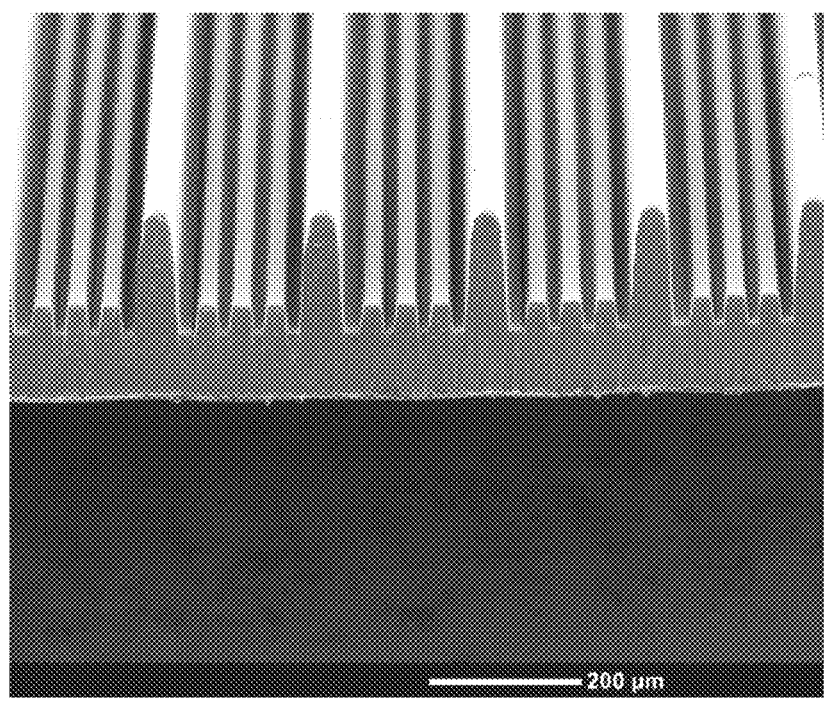

FIG. 8C depicts another film configuration that includes five sets of channels in first 891, second 892, and third 893 groups arranged respectively in first 811, second 812, and third 813 sections of the film 810c. The first section 811 that includes the first group 891 of channels is arranged between the second section 812 that includes the second group 892 of channels and the third section 813 that includes the third group 893 of channels. The first group 891 includes major channels 830c and minor channels 820c disposed within the major channels 830c. The channels 830c, 820c are oriented so that the longitudinal axes of the channels 830c, 820c are oriented substantially parallel to a longitudinal axis of the film. The second group 892 of channels includes major channels 840c having longitudinal axes that are disposed at an angle to the longitudinal axis of the film 810c. The third group 893 of channels includes minor channels 860c disposed within major channels 850c, the minor 860c and major 850c channels having longitudinal axes that are disposed at an angle to the longitudinal axis of the film 810c. The angle of channels 850c and 860c with respect to the longitudinal axis of the film 810c may be the same as or different from the angle of channels 840c.

According to some embodiments, the film may have the substantially the same stiffness across the lateral y-axis and longitudinal x-axis of the film. In some embodiments, it may be useful for the film to have some areas that are stiffer than other areas to reduce lateral stiffness For example, to reduce lateral sagging, the film may optionally have regions of greater stiffness 880 located near the sides 813, 814 of the film 810a as illustrated in FIG. 8A.

The fluid control films discussed herein can be formed from any polymeric materials suitable for casting or embossing including, for example, polyethelyne, polypropylene, polyesters, co-polyesters, polyurethane, polyolefins, polyamides, poly(vinyl chloride), polyether esters, polyimides, polyesteramide, polyacrylates, polyvinylacetate, hydrolyzed derivatives of polyvinylacetate, etc. Specific embodiments use polyolefins, particularly polyethylene or polypropylene, blends and/or copolymers thereof, and copolymers of propylene and/or ethylene with minor proportions of other monomers, such as vinyl acetate or acrylates such as methyl and butylacrylate. Polyolefins readily replicate the surface of a casting or embossing roll. They are tough, durable and hold their shape well, thus making such films easy to handle after the casting or embossing process. Hydrophilic polyurethanes have physical properties and inherently high surface energy. Alternatively, fluid control films can be cast from thermosets (curable resin materials) such as polyurethanes, acrylates, epoxies and silicones, and cured by exposure radiation (e.g., thermal, UV or E-beam radiation, etc.) or moisture. These materials may contain various additives including surface energy modifiers (such as surfactants and hydrophilic polymers), plasticizers, antioxidants, pigments, release agents, antistatic agents, and the like. Suitable fluid control films also can be manufactured using pressure sensitive adhesive materials. In some cases the channels may be formed using inorganic materials (e.g., glass, ceramics, or metals). Generally, the fluid control film substantially retains its geometry and surface characteristics upon exposure to fluids. A suitable stiffness of the fluid control film may be in a range of between about 100 pounds per foot per linear inch and about 1500 pounds per foot per linear inch. According to some embodiments, the lateral stiffness may be greater than the longitudinal stiffness. A desired amount of lateral curvature may be induced in the film when the lateral stiffness is greater than the longitudinal stiffness.

In some embodiments, the fluid control film may include a characteristic altering additive or surface coating. Examples of additives include flame-retardants, hydrophobics, hydrophilics, antimicrobial agents, inorganics, corrosion inhibitors, metallic particles, glass fibers, fillers, clays and nanoparticles.

The surface of the film may be modified to ensure sufficient capillary forces. For example, the surface may be modified in order to ensure it is sufficiently hydrophilic. The films generally may be modified (e.g., by surface treatment, application of surface coatings or agents), or incorporation of selected agents, such that the film surface is rendered hydrophilic so as to exhibit a contact angle of 90 degrees or less or 45 degrees or less with aqueous fluids. According to some embodiments, the flexible film includes a hydrophilic coating on one or both film surfaces comprising an organosilane deposited by plasma enhanced chemical vapor deposition (PECVD).

Any suitable known method may be utilized to achieve a hydrophilic surface on fluid control films of the present invention. Surface treatments may be employed such as topical application of a surfactant, plasma treatment, vacuum deposition, polymerization of hydrophilic monomers, grafting hydrophilic moieties onto the film surface, corona or flame treatment, etc. Alternatively, a surfactant or other suitable agent may be blended with the resin as an internal characteristic-altering additive at the time of film extrusion. Typically, a surfactant is incorporated in the polymeric composition from which the fluid control film is made rather than rely upon topical application of a surfactant coating, since topically applied coatings may tend to fill in (i.e., blunt), the notches of the channels, thereby interfering with the desired fluid flow to which the invention is directed. When a coating is applied, it is generally thin to facilitate a uniform thin layer on the structured surface. An illustrative example of a surfactant that can be incorporated in polyethylene fluid control films is TRITON™ X-100 (available from Union Carbide Corp., Danbury, Conn.), an octylphenoxypolyethoxyethanol nonionic surfactant, e.g., used at between about 0.1 and 0.5 weight percent.

Other surfactant materials that are suitable for increased durability requirements for building and construction applications of the present invention include Polystep® B22 (available from Stepan Company, Northfield, Ill.) and TRITON™ X-35 (available from Union Carbide Corp., Danbury, Conn.).

A surfactant or mixture of surfactants may be applied to the surface of the fluid control film or impregnated into the film in order to adjust the properties of the fluid control film. For example, it may be desired to make the surface of the fluid control film more hydrophilic than the film would be without such a component.

A surfactant such as a hydrophilic polymer or mixture of polymers may be applied to the surface of the fluid control film or impregnated into the film in order to adjust the properties of the fluid control film. Alternatively, a hydrophilic monomer may be added to the film and polymerized in situ to form an interpenetrating polymer network. For example, a hydrophilic acrylate and initiator could be added and polymerized by heat or actinic radiation.

Suitable hydrophilic polymers include: homo and copolymers of ethylene oxide; hydrophilic polymers incorporating vinyl unsaturated monomers such as vinylpyrrolidone, carboxylic acid, sulfonic acid, or phosphonic acid functional acrylates such as acrylic acid, hydroxy functional acrylates such as hydroxyethylacrylate, vinyl acetate and its hydrolyzed derivatives (e.g. polyvinylalcohol), acrylamides, polyethoxylated acrylates, and the like; hydrophilic modified celluloses, as well as polysaccharides such as starch and modified starches, dextran, and the like.

As discussed above, a hydrophilic silane or mixture of silanes may be applied to the surface of the fluid control film or impregnated into the film in order to adjust the properties of the fluid control film. Suitable silanes include the anionic silanes disclosed in U.S. Pat. No. 5,585,186, as well as non-ionic or cationic hydrophilic silanes.

Additional information regarding materials suitable for microchannel fluid control films discussed herein is described in commonly owned U.S. Patent Publication 2005/0106360, which is incorporated herein by reference.

In some embodiments, a hydrophilic coating may be deposited on the surface of the fluid control film by plasma deposition, which may occur in a batch-wise process or a continuous process. As used herein, the term "plasma" means a partially ionized gaseous or fluid state of matter containing reactive species which include electrons, ions, neutral molecules, free radicals, and other excited state atoms and molecules.

In general, plasma deposition involves moving the fluid control film through a chamber filled with one or more gaseous silicon-containing compounds at a reduced pressure (relative to atmospheric pressure). Power is provided to an electrode located adjacent to, or in contact with film. This creates an electric field, which forms a silicon-rich plasma from the gaseous silicon-containing compounds.

Ionized molecules from the plasma then accelerate toward the electrode and impact the surface of the fluid control film. By virtue of this impact, the ionized molecules react with, and covalently bond to, the surface forming a hydrophilic coating. Temperatures for plasma depositing the hydrophilic coating are relatively low (e.g., about 10 degrees C.). This is beneficial because high temperatures required for alternative deposition techniques (e.g., chemical vapor deposition) are known to degrade many materials suitable for multi-layer film 12, such as polyimides.

The extent of the plasma deposition may depend on a variety of processing factors, such as the composition of the gaseous silicon-containing compounds, the presence of other gases, the exposure time of the surface of the fluid control film to the plasma, the level of power provided to the electrode, the gas flow rates, and the reaction chamber pressure. These factors correspondingly help determine a thickness of hydrophilic coating.

The hydrophilic coating may include one or more silicon-containing materials, such as silicon/oxygen materials, diamond-like glass (DLG) materials, and combinations thereof. Examples of suitable gaseous silicon-containing compounds for depositing layers of silicon/oxygen materials include silanes (e.g., $SiH_4$). Examples of suitable gaseous silicon-containing compounds for depositing layers of DLG materials include gaseous organosilicon compounds that are in a gaseous state at the reduced pressures of reaction chamber 56. Examples of suitable organosilicon compounds include trimethylsilane, triethylsilane, trimethoxysilane, triethoxysilane, tetramethylsilane, tetraethylsilane, tetramethoxysilane, tetraethoxysilane, hexamethylcyclotrisiloxane, tetramethylcyclotetrasiloxane, tetraethylcyclotetrasiloxane, octamethylcyclotetrasiloxane, hexamethyldisiloxane, bistrimethylsilylmethane, and combinations thereof. An example of a particularly suitable organosilicon compound includes tetramethylsilane.

After completing a plasma deposition process with gaseous silicon-containing compounds, gaseous non-organic compounds may continue to be used for plasma treatment to remove surface methyl groups from the deposited materials. This increases the hydrophilic properties of the resulting hydrophilic coating.

Additional information regarding materials and processes for applying a hydrophilic coating to a fluid control film as discussed in this disclosure is described in commonly owned U.S. Patent Publication 2007/0139451, which is incorporated herein by reference.

Figure 9A:
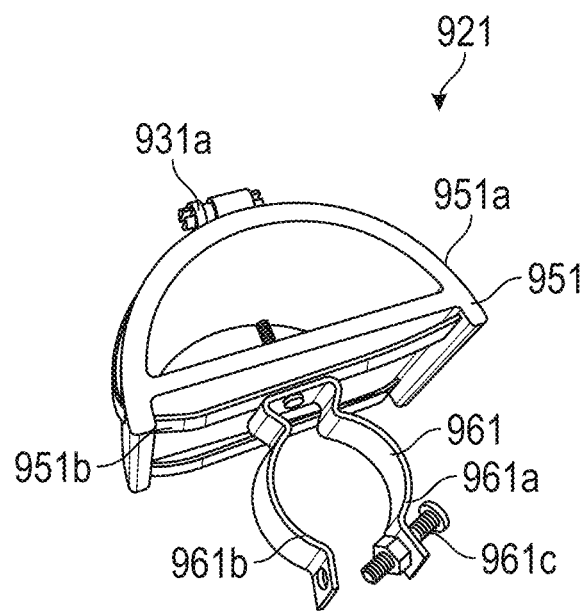
FIGS. 9A and 9B are photographs that show a film support in accordance with some embodiments.
Figure 9B:
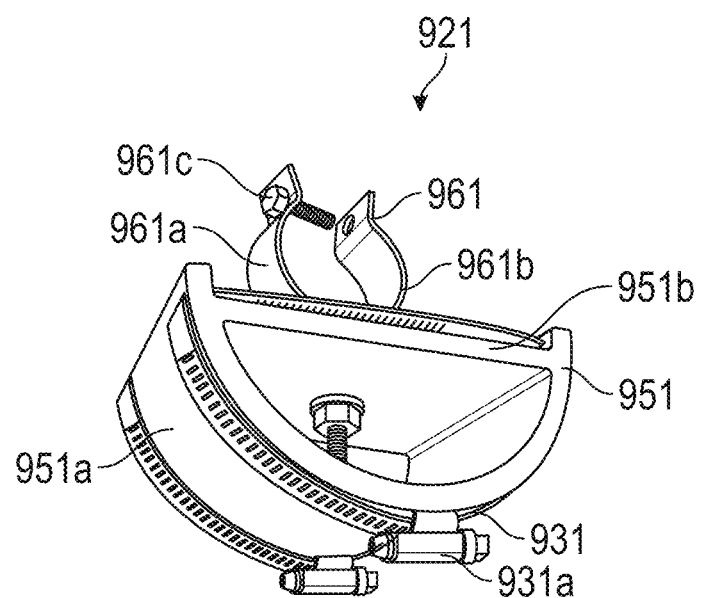
Figure 10:
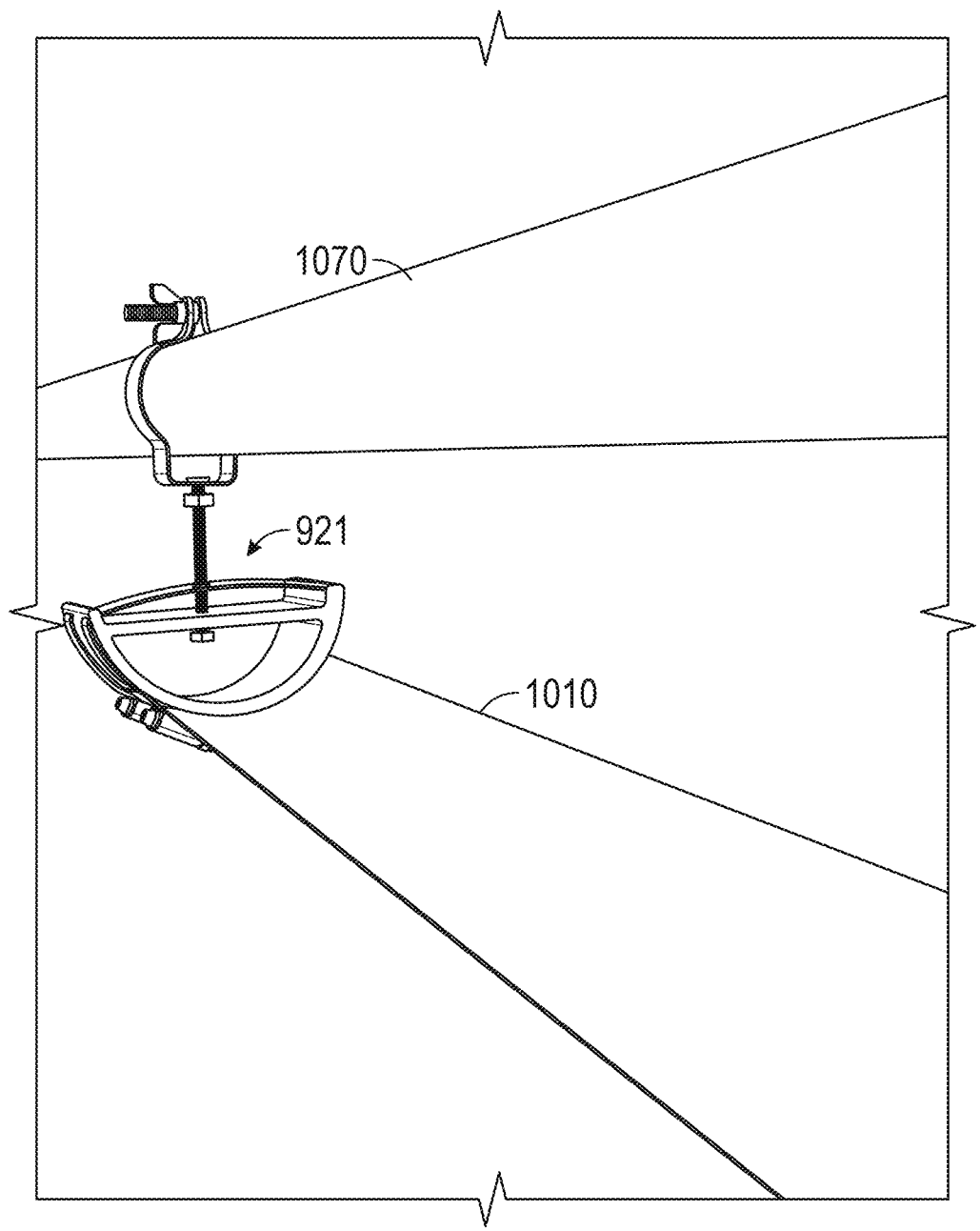
FIG. 10 is a photograph of a flexible film mounted to a pipe by the film support of FIGS. 9A and 9B.

FIGS. 9A and 9B are photographs that show a film support 921 in accordance with some embodiments. FIG. 10 is a photograph of a flexible film 1010 mounted to a pipe 1070 by the film support 921 of FIGS. 9A and 9B. The film support 921 may be configured such that the film 1010 can be removably attached to the film support 921 allowing the film to be attached to the pipe and the subsequently removed and replaced with a new film.

The film support 921 includes an attachment portion 951 that includes a curved attachment surface 951a with a connecting portion 951b extending between and connecting the ends of the curved attachment surface 951a. The film support 921 also includes a film retainer 931 configured to attach an end of an elongated flexible film (not shown in FIGS. 9A and 9B) to the attachment component 951 at the curved attachment surface 951a. The film retainer 931 shown in FIGS. 9A and 9B comprises at least one strap that at least partially encircles the attachment component 951.

Attachment of the flexible film to the curved attachment surface 951a imparts a curvature to the flexible film. In some embodiments, the curved attachment surface 951a has a radius of curvature between about 3 cm to about 10 cm or about 5 cm. The curved attachment surface 951a and the film retainer 931 are configured to operate together to secure the flexible film such that the film extends away from the attachment area under tension. The film retainer 931 can be tightened against the curved attachment surface 951a by a screw 931a or other mechanism.

The film support 921 includes one or more mounting features 961 configured to mount the film support relative to a condensate forming surface in an orientation that allows condensate that forms on the condensate forming surface to fall onto a concave surface of the film. The mounting features 961 are attached to the connecting portion 951b of the attachment component 951 in this embodiment. The mounting feature 961 shown in FIGS. 9A, 9B, and 10 is a bracket that attaches the film support 921 to a pipe 1070 that has a condensate producing surface. The bracket 961 includes at least one curved portion, shown in FIGS. 9A and 9B as curved portions 961a, 961b, which are configured to at least partially encircle the pipe 1070. The curved portions 961a, 961b may be fastened together by a screw 961c or other mechanism after being installed on the pipe 1070.

Figure 11:
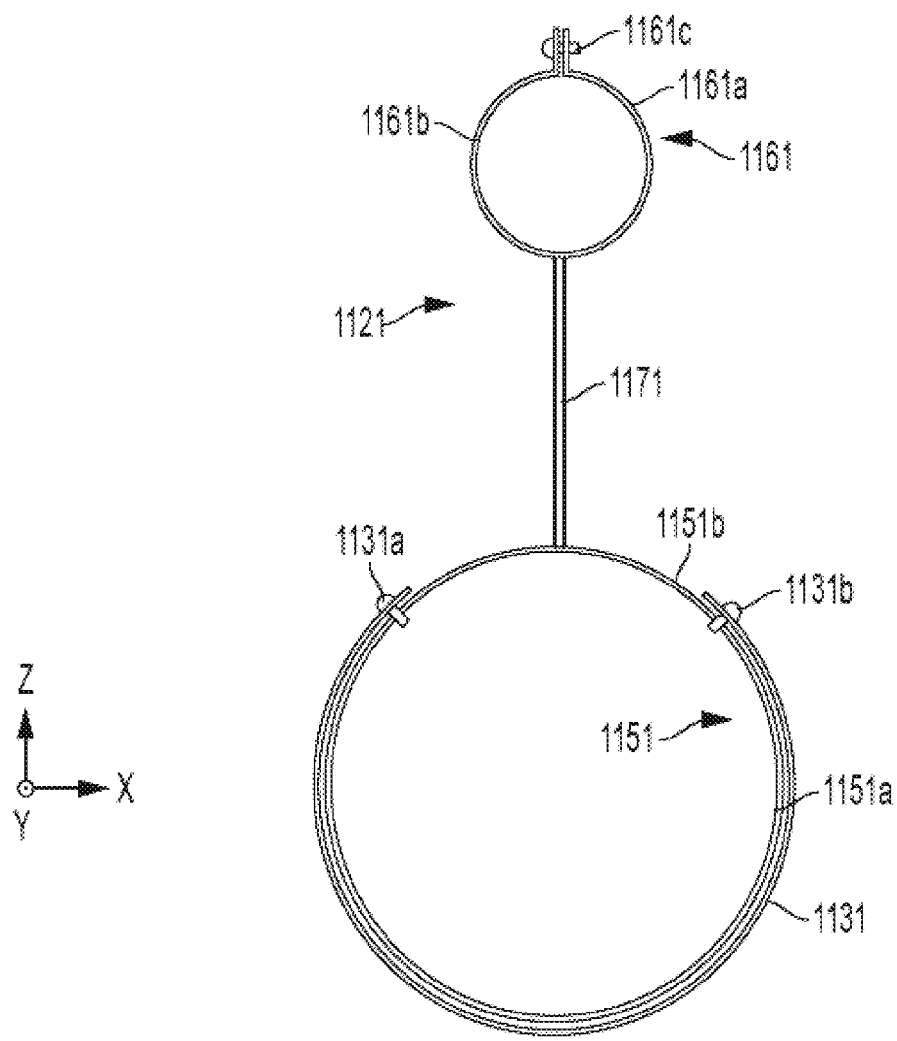
FIG. 11 is a diagram of a film support in accordance with some embodiments.

FIG. 11 shows another embodiment of a film support 1121. Film support 1121 includes an attachment portion 1151 having a curved attachment surface 1151a. A film retainer 1131 is configured to mount against the curved attachment surface 1151a in such a way that the film (not shown in FIG. 11) is held between the film retainer 1131 and the curved attachment surface 1151a by friction. As shown in FIG. 11, the film support 1121 may include two or more fasteners 1131a, 1131b that attach the film retainer 1131 to the attachment portion 1151. These fasteners 1131a, 1131b may be any type of fastener that attaches the film retainer to the attachment portion. In some embodiments, one fastener 1131a may be configured so that one end of the film retainer 1131 is more difficult to detach from the attachment portion 1151 and another fastener 1131b may be designed so that another end of the film retainer 1131 can be easily detached from the attachment portion 1151.

A mount portion 1161 is configured to mount the film support 1121 to a pipe or other condensate-producing surface. As shown in FIG. 11, in some embodiments, the mount portion 1161 includes first and second curved portions 1161a, 1161b that can be clamped around a pipe and attached together by a screw or other fastener 1161c. An extension portion 1171 separates the mount portion 1161 and the attachment portion 1151 and may be of variable length to facilitate providing a slope to the film as previously illustrated in FIG. 2.

Figures 12A, 12B:
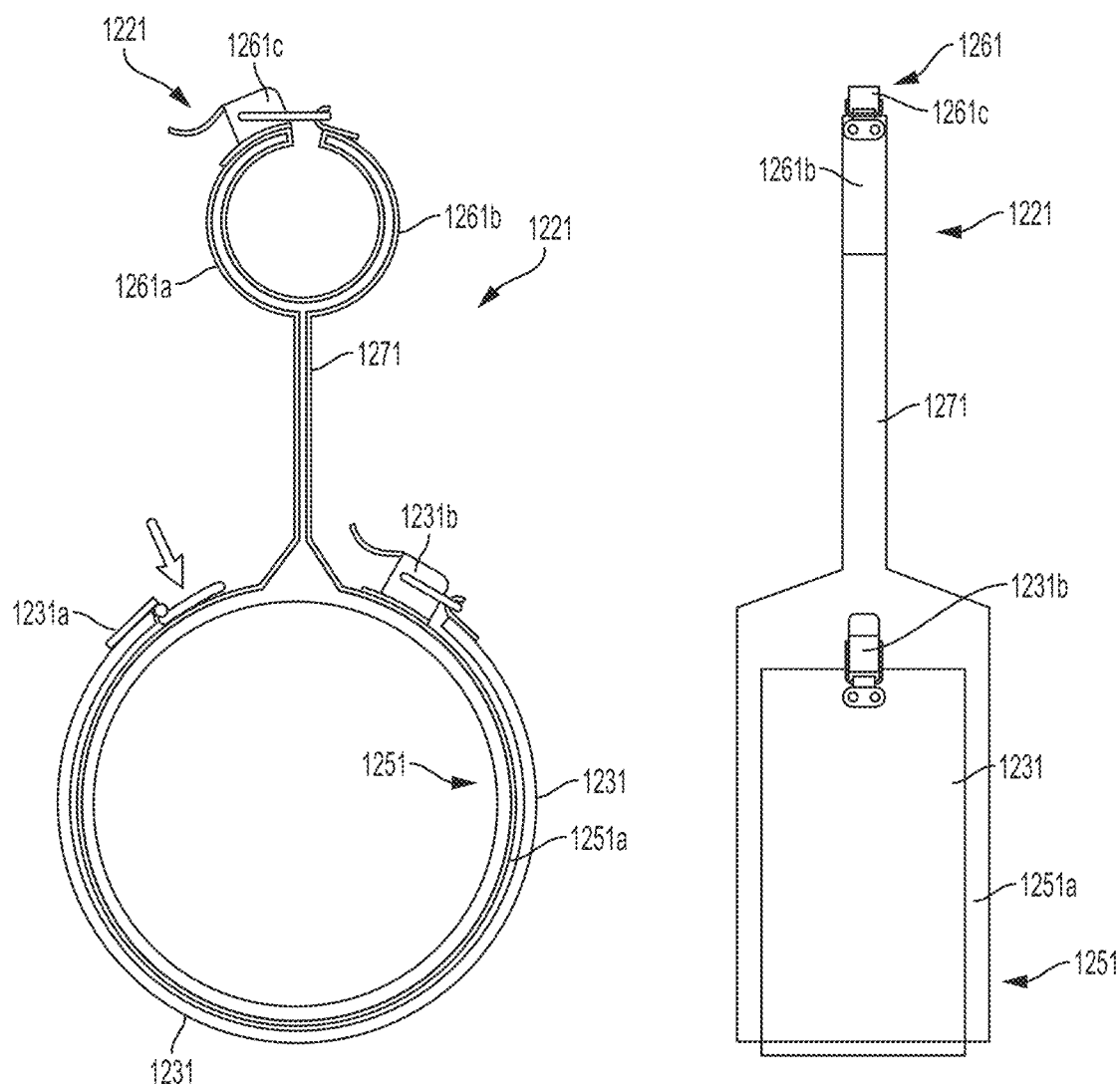
FIGS. 12A and 12B respectively show end and side views of yet another embodiment of a film support.

FIGS. 12A and 12B respectively show end and side views of yet another embodiment of a film support 1121. Film support 1221 includes an attachment portion 1251 having a curved attachment surface 1251a. A film retainer 1231 is configured to mount against the curved attachment surface 1251a in such a way that the film (not shown in FIGS. 12A and 12B) is held between the film retainer 1231 and the curved attachment surface 1251a by friction. As previously described, the retainer 1231 may be aligned with a recess (see element 140 in FIG. 1B) in the attachment surface 1251a to increase the grip on the film. As shown in FIGS. 12A and 12B, the film retainer 1231 may include a hinge 1231a on one side and a latch 1231b at the other side, the hinge 1231a and latch 1231b configured to attach the film retainer 1231 to the attachment portion 1251 in a way that provides for quick disconnection of the latch side of the film retainer 1231 from the attachment portion 1251. A mount portion 1261 is configured to mount the film support 1221 to a pipe or other condensate-producing surface. The mount portion 1261 includes first and second curved portions 1261a, 1261b that can be clamped around a pipe and attached together by a latch 1261c or other quick disconnect mechanism. An extension portion 1271 separates the mount portion 1261 and the attachment portion 1251.

Figure 13:
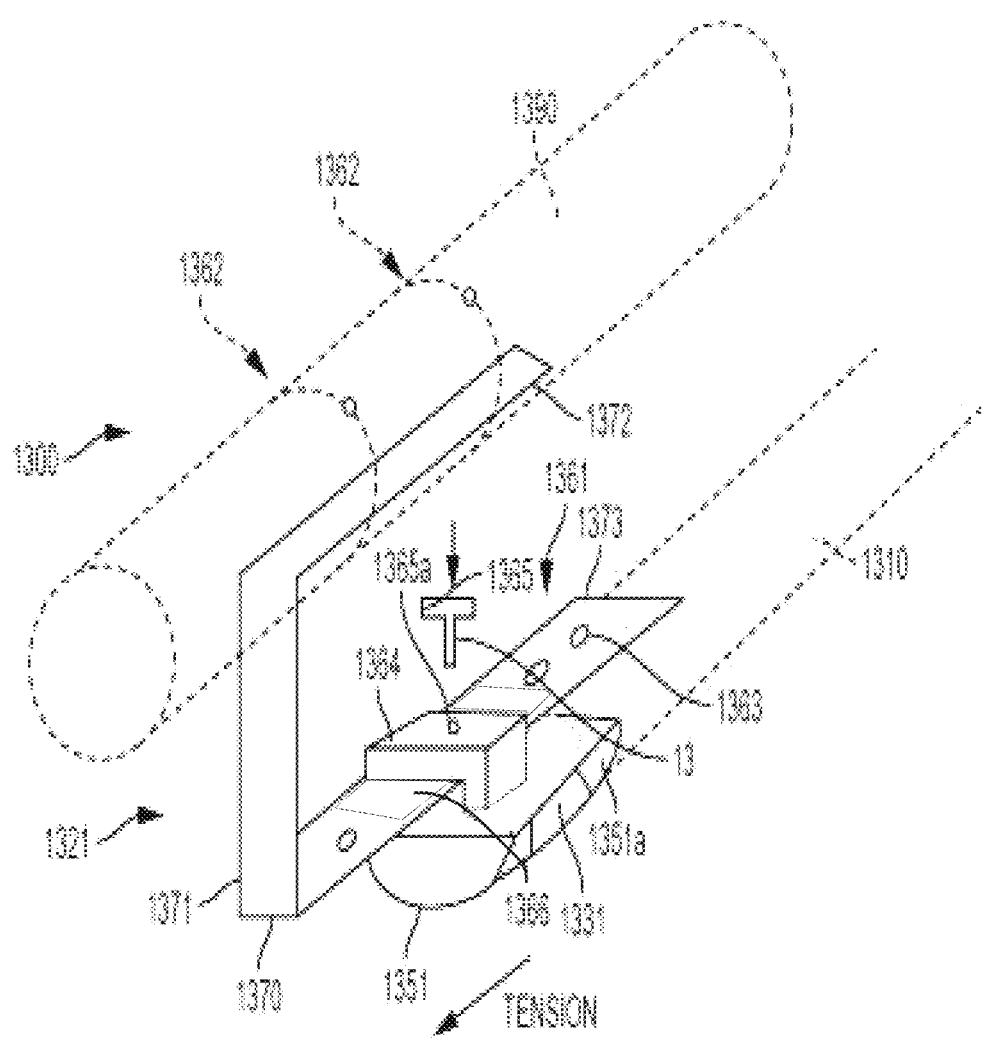
FIG. 13 shows a portion of a condensate management system depicting another embodiment of a film support.

FIG. 13 shows a portion of a condensate management system 1300 that depicts another embodiment of a film support 1321. In this embodiment, the film support 1321 comprises a U-shaped bracket 1370 comprising an upper portion 1372, a lower portion 1373, and an extension portion 1371 that connects the upper and lower portions 1372, 1373. The upper portion 1372 is attached to a pipe 1390 (or other structure) to orient the film 1310 relative to a condensate-producing surface so that condensate from the condensate-producing surface falls onto the film 1310. As shown in FIG. 13, when the film support 1321 is attached to a pipe 1390, the upper portion 1372 of the U-shaped bracket 1370 may be secured to the pipe 1390 by one or more clamps 1362 that encircle the pipe 1390. The film support 1321 includes a second bracket 1364 that attaches the lower portion 1373 of the U-shaped bracket 1370 to the attachment portion 1351 of the film support 1321. The lower portion of the U-shaped bracket 1370 includes a number of holes 1363 and the second bracket 1364 includes at least one hole 1365a. The film 1320 is attached to the curved attachment surface 1371a of the attachment portion 1351 by a film retainer 1331. The tension in the film 1310 can be adjusted to the proper tension by sliding the attachment portion 1351 and the second bracket 1365 back and forth along the lower portion 1373 of the U-shaped bracket 1370. When the desired tension in the film 1310 is attained, a bolt or lock 1365 can be inserted through the at least one hole 1365a of the second bracket 1364 and into one of the holes 1363 of the lower portion 1373 of the U-shaped bracket 1370 to lock the position of the film 1310 at a desired amount of tension. In some alternate embodiments, the U-shaped bracket 1370 may not include holes 1363 and the support 1321 is held in place by a bolt 1365 that is tightened against the lower portion if the U-shaped bracket 1370. In some alternate embodiments, there may be a ratchet mechanism 1366 disposed between the between the second bracket 1364 and the upper surface of the film support attachment portion 1351. The ratchet mechanism 1366 can allow the film to be tensioned in one direction and not slip backwards until disengaged.

Figure 14:
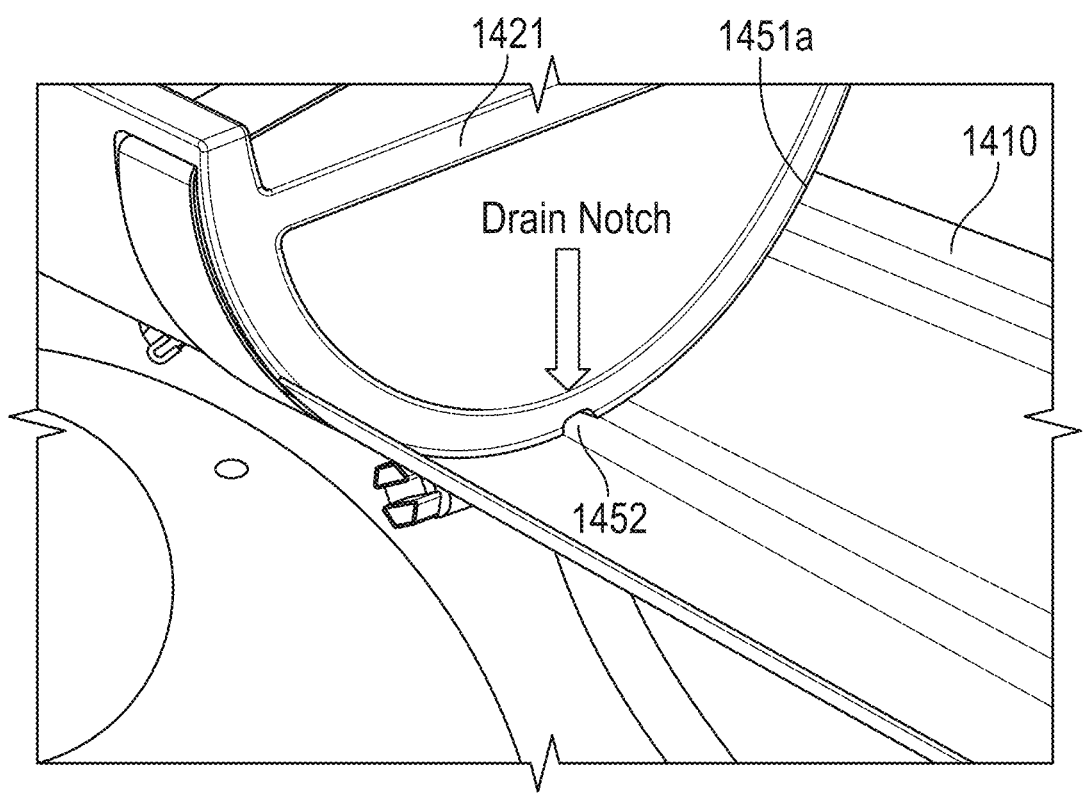
FIG. 14 illustrates a curved attachment area of a film support that includes a condensate drain notch configured to allow the condensate to drain from the film in accordance with some embodiments.

As depicted in FIG. 14, a curved attachment area 1451a of a film support 1421 may include one or more condensate drain notches 1452 configured to allow the condensate to drain from the film 1410. The drain notches 1452 reduce the build up of condensate at the edge of the attachment component 1451 when there is a relatively large volume of condensate collected at the end of the film. The drain notches 1452 extend through the attachment component 1451, forming one or more flow channels that are substantially aligned with the longitudinal axis of the film in some embodiments. (see FIG. 1C). As best seen in FIG. 1C, according to some embodiments, the one or more drain notches 1452 may be fluidically coupled to drain tubing 1453 that directs condensate that travels through the drain notches into an appropriate receptacle.

Figure 15:
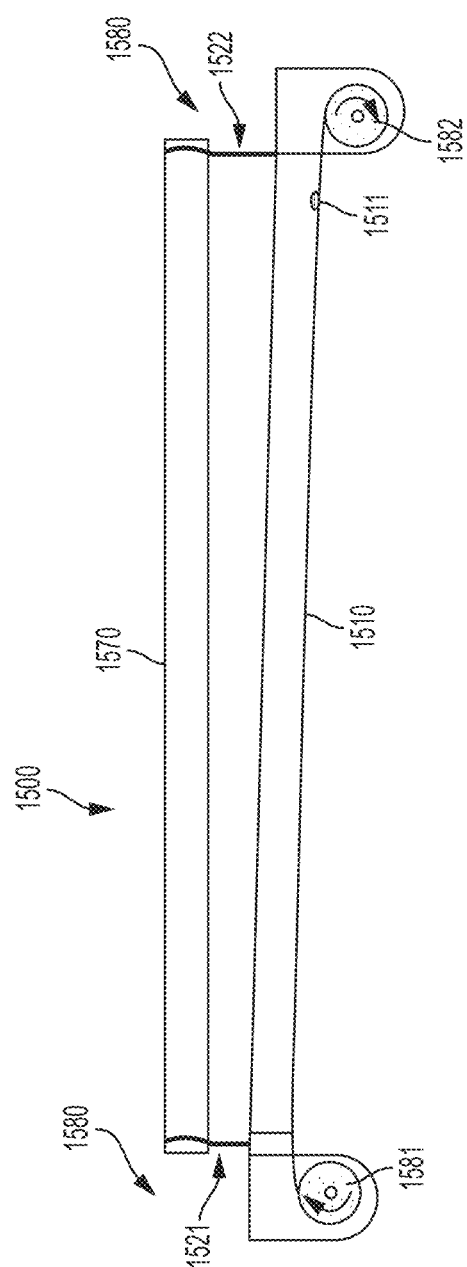
FIG. 15 shows a condensate management system that includes a mechanism that facilitates replacement of the flexible film in accordance with some embodiments.

As conceptually illustrated in FIG. 15, in some embodiments the condensate management system 1500 includes a mechanism that facilitates replacement of the flexible film 1510. FIG. 15 shows a flexible film 1510 attached to a condensate producing pipe 1570 by first and second film supports 1521, 1522. A film replacement mechanism 1580 includes an input roll 1581 that holds a quantity of the flexible film 1510 in rolled up form. The film replacement mechanism 1580 also includes a waste roller 1582 that holds waste film. When the film 1510 is replaced, the waste roller 1582 may be manually or automatically rotated, pulling clean film from the input roller 1581 into place between the film supports 1521, 1522 and at the same time rolling the used film onto the waste roller 1582. In some embodiments, the input and waste rollers 1581, 1582 may be locked into place to tension the film 1510.

In the embodiment of FIG. 15 (or other embodiments disclosed herein, such as the embodiments shown in FIGS. 1A-1D, 2C, and 4A-4C) the condensate can be drained through a hole 1511 punched in the film 1510. In this way the film 1510 can be drained prior to reaching the waste roller, 1582 or other film support. Such an implementation obviates the need for the drain notch if the hole is just in front of the support.

EXAMPLES

Preparation of Microchannel Films

Microchannel films were formed by an extrusion embossing process as described in above. Extrusion temperature, roll temperature, and nip force were selected based on the melt flow properties for each resin. Surface hydrophilization for Sample A was performed as described herein using a chemical enhanced plasma vapor deposition process. Hydrophilization of Sample B was achieved by addition of 0.5% by weight of Triton X-35 to the polymer resin during extrusion. The microchannel geometry is depicted in the photograph of FIG. 8D. Briefly, the structure comprises a series of major channels separated by three minor channels. The materials, base film thickness, and major channel heights are described in Table 1.

TABLE 1

| SAMPLE | Polymer | Trade Name | Channel Angle (degrees relative to down web direction) | Base Film Thickness (microns) | Major Channel Height | Hydrophilization |
|---|---|---|---|---|---|---|
| A | Low Density Polyethylene | Dow 955i | 20 | 100 | 170 | PECVD |
| B | Low Density Polyethylene | 18BOA | 0 | 50 | 190 | Surfactant |
| C | Polypropylene impact copolymer | CN700-35N | 20 | 75 | 170 | none |
| D | Co-Polyester | Eastar 6763 | 20 | 50 | 25 | none |
| E | Polyether-type thermoplastic polyurethane (TPU) | Estane 58212 | 20 | 125 | 170 | none |
| F | Polyester | Melinex 454 | none | 75 | No channels | none |

A) Dow Chemical Company.
B) Eastman Kodak
C) Braskem America, Philadelphia, PA
D) Eastman Chemical Company, Kingsport TN
E) Lubrizol Advanced Materials Corporation, Cleveland, OH
F) DuPont Teijin Films, Chester, VA.

Tensile Testing

Tensile testing was performed on a uniaxial universal testing machine using a 1000N load cell (MTS Systems Corporation, Eden Prairie Minn.). 6 inch by 1 inch samples were cut from film rolls with either down web or cross web orientation. The film samples were clamped in the grips with a gauge length of 4 inches. Samples were elongated at 2 inches per minute with data collected at 10 HZ. Sample stiffness was calculated as the load (lbf) over strain (inches/inch) for the initial 0.5% elongation and is reported in Table 3.

Film Anchor Assembly

Film supports as shown in FIGS. 9A and 9B were fabricated via 3D printing. The supports comprise 5.1 cm radius of curvature semicircle with a planar section joining the open ends of the semicircle. A clip style pipe hangar was attached at the center point of the planar section. Two hose clamps were attached approximately ⅛ inch from each edge of the semicircular section.

Example 1

Film Curvature

Two film supports were placed 8 feet apart on a level 2.5 inch diameter galvanized steel pipe and secured by tightening the mounting bracket bolts of the film supports. Four inch wide film samples were secured to the film support using hose clamps as the film retainers. The mounting bracket bolt was loosened on one film supports and the film was tensioned by pulling on the film support with a hanging scale (Cabela's Digital Scale, item number IK-130100) until 10 pounds of tension was achieved. The mounting bracket bolt was then tightened to secure the bracket in position with the film under tension. The curvature of the film at the midpoint (4 feet) between the brackets was determined by measuring the width (W) and height (H) of the film using a digital caliper as shown in FIG. 3. The radius of curvature (R) was calculated as shown in the formula in FIG. 3. Width, height and calculated radius of curvature are shown in Table 2.

TABLE 2

Film Curvature Measurements

| FILM | Channel Side | Width (mm) | Height (mm) |
|---|---|---|---|
| C | Facing pipe | 79 | 26 |
| C | Facing down | 102 | −4 (curved down) |
| A | Facing pipe | 87 | 21 |
| A | Facing down | 97 | 14 |
| B | Facing pipe | 87 | 22 |
| B | Facing down | 89 | 21 |
| F | No channels | 100 | 11 |
| E | Facing pipe | 81 | 24 |
| E | Facing down | 97 | 11 |
| D | Facing pipe | 101 | 11 |
| D | Facing down | 102 | 12 |

TABLE 3

Relationship between calculated film radius of curvature at midpoint, channel orientation, and film stiffness.

| FILM | Radius of curvature channels facing pipe (cm) | Radius of curvature channels away from pipe (cm) | Down web stiffness (pounds of force per inch width) | Cross web stiffness (pounds of force per inch width) |
|---|---|---|---|---|
| C: Polypropylene 20 degree | 4.3 | −31.8 (curled down) | 932 | 609 |
| A: Polyethylene 20 degree | 5.5 | 9.2 | 201 | 184 |
| B: Polyethylene 0 degree | 5.5 | 5.7 | 216 | 189 |
| E: Polyurethane 20 degree | 4.7 | 11.4 | 122 | 120 |
| D: PETg 20 degrees | 12.4 | 11.1 | 1126 | 946 |
| F: Melinex PET 3 mil (no channels) | 12.4 | not performed (no channels) | 1847 | 2110 |

These results demonstrate that channels angled at 20 degrees showed greater curvature at the midpoint when oriented facing the pipe than facing away from the pipe for samples A, C and E. The effect was most pronounced with sample C, which curled in the opposite direction of the pipe clamps with the channels facing away from the pipe. The curl induced by the angled channels is advantageous in preventing film twisting laterally as water accumulates prior to or during transport to the low end.

Figure 16A:
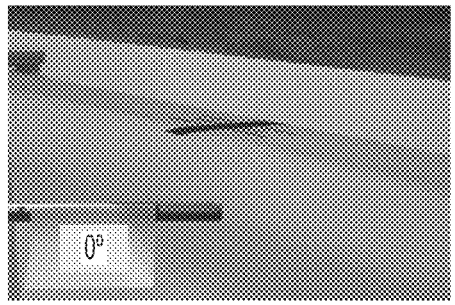
FIGS. 16A through 16J are images of curled films having channels oriented at various angles with respect to the longitudinal axis of the film in accordance with various embodiments.
Figure 16B:
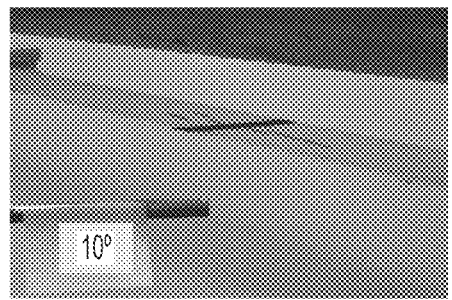
Figure 16C:
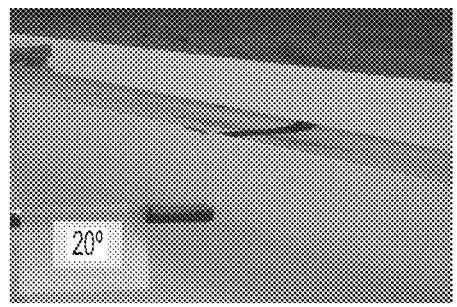
Figure 16D:
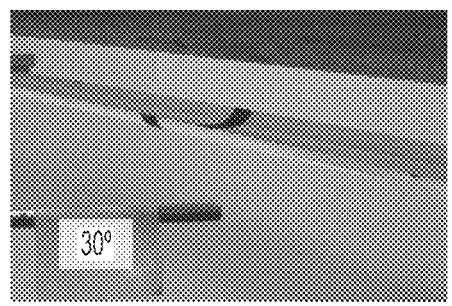
Figure 16E:
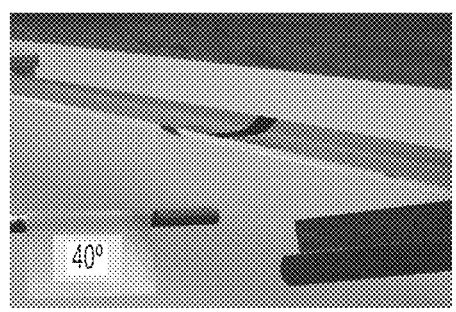
Figure 16F:
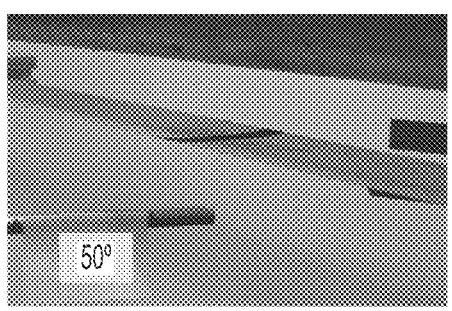
Figure 16G:
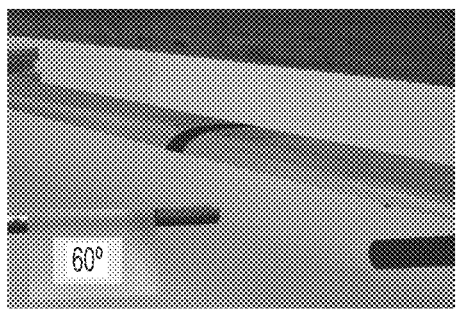
Figure 16H:
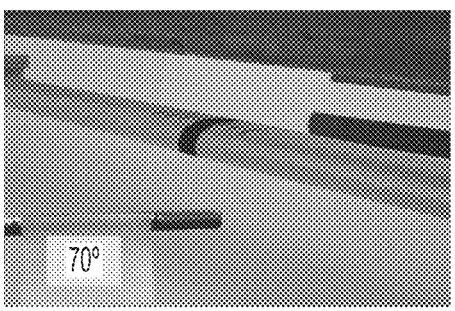
Figure 16I:
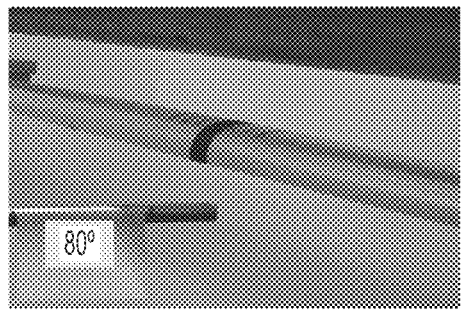
Figure 16J:
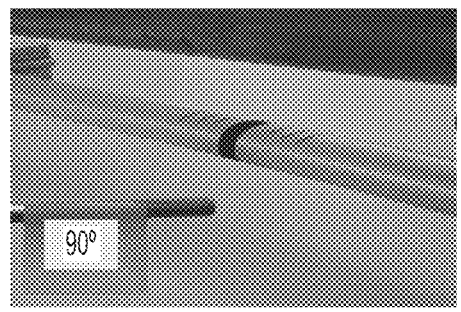

To further characterize the relationship between channel angle and film curl, 2 inch wide by 24 inch long samples of film A were prepared by slitting the film with a razor using a protractor to prepare samples at 10 degree increments, with 0 degrees being defined as channels running the length of the film (parallel to the edges) and 90 degrees being perpendicular to the edges of the film. The films were mounted in linear (not curved) holders by wrapping the film around a 0.5 cm diameter plastic rod and securing the film in the groove of an extruded aluminum bracket mounted to a pipe clip bracket. One bracket was secured to the pipe by tightening the bolt. The film was tensioned to 5 pounds of force as described in Example 1 and the height at the midpoint between brackets was measured as reported in Table 4. Negative values indicated curl away from the channel side of the film, positive values indicated curl towards the channels. Images of the curled films are shown in FIGS. 16A through 16J, where FIG. 16A shows an image of a film having channels oriented at 0 degrees with respect to the longitudinal axis of the film; FIG. 16B shows an image of a film having channels oriented at 10 degrees with respect to the longitudinal axis of the film; FIG. 16C shows an image of a film having channels oriented at 20 degrees with respect to the longitudinal axis of the film; FIG. 16D shows an image of a film having channels oriented at 30 degrees with respect to the longitudinal axis of the film; FIG. 16E shows an image of a film having channels oriented at 40 degrees with respect to the longitudinal axis of the film; FIG. 16F shows an image of a film having channels oriented at 50 degrees with respect to the longitudinal axis of the film; FIG. 16G shows an image of a film having channels oriented at 60 degrees with respect to the longitudinal axis of the film; FIG. 16H shows an image of a film having channels oriented at 70 degrees with respect to the longitudinal axis of the film; FIG. 16I shows an image of a film having channels oriented at 80 degrees with respect to the longitudinal axis of the film; and FIG. 16J shows an image of a film having channels oriented at 90 degrees with respect to the longitudinal axis of the film. Prior to tensioning a series of lines depicting the channel orientation were drawn on the film. A perpendicular black line was drawn on the film at the midpoint to aid in visualization of film curl.

TABLE 4

Relationship between curl and channel angle

| Channel angle (degrees, relative to film edge) | Height (mm) |
| --- | --- |
| 0 | −1 |
| 10 | 0.5 |
| 20 | 3 |
| 30 | 7 |
| 40 | 5 |
| 50 | 2 |
| 60 | −9 |
| 70 | −13 |
| 80 | −15 |
| 90 | −13 |

Example 2

Film Sag Under Load

Film samples were tensioned between curved film anchors as described in Example 1. The height of the film above a reference height at the midpoint was measured using a digital caliper. 20 grams of water was added at the midpoint of the film and the height was measured. Sag was calculated by subtracting the height with water from the height without water as reported in Table 5.

TABLE 5

Film sag under load

| FILM | sag with 20 grams water channels facing pipe (mm) | down web stiffness (pounds of force per inch width) |
| --- | --- | --- |
| C: Polypropylene 20 degree | 5.4 | 932 |
| A: Polyethylene 20 degree | 5.7 | 201 |
| B: Polyethylene 0 degree | 6.6 | 216 |
| E: Polyurethane 20 degree | 6.9 | 122 |
| D: PETg 20 degrees | 3.5 | 1126 |
| F: Melinex PET 3 mil (no channels) | 2.8 | 1847 |

This example demonstrates that stiffer films have less sag than elastic films. In practical terms a film with more sag would require a steeper slope to ensure transport of water to the low end of the film.

Example 3

Figure 17:
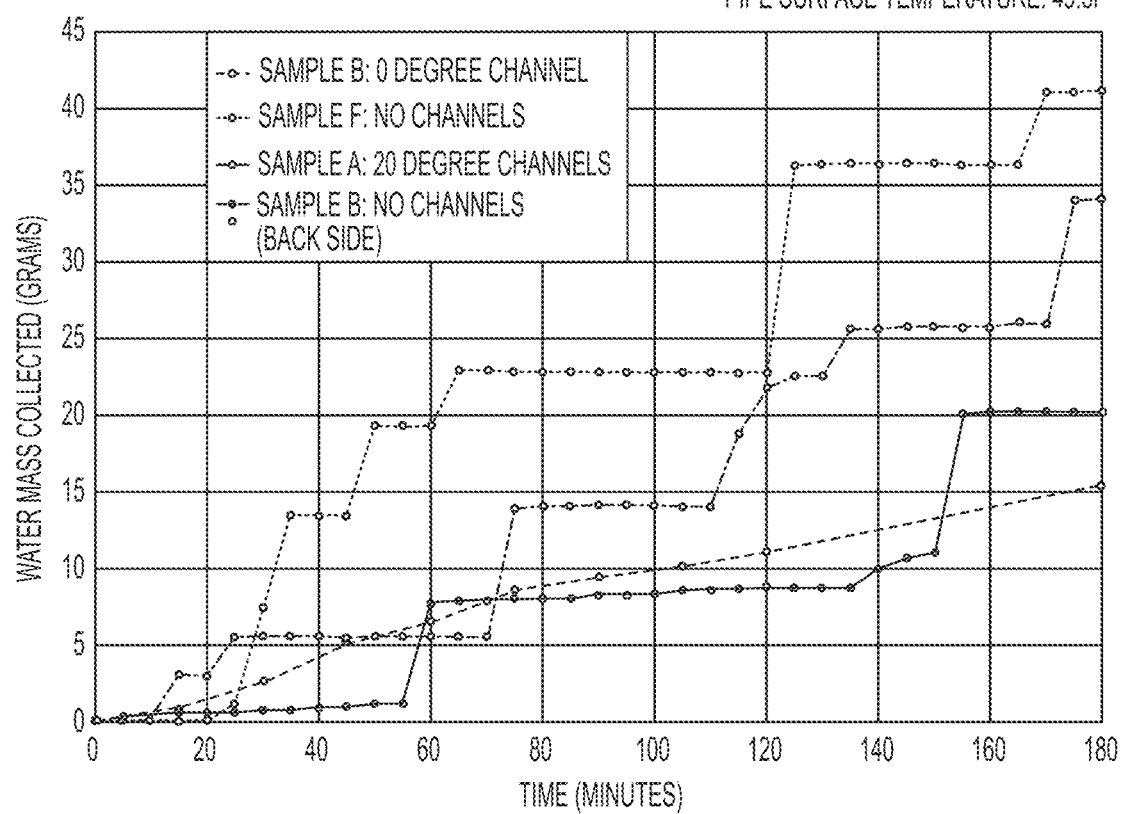
FIG. 17 is a graph showing the amount of water collected over time for various samples.
Figure 18A:
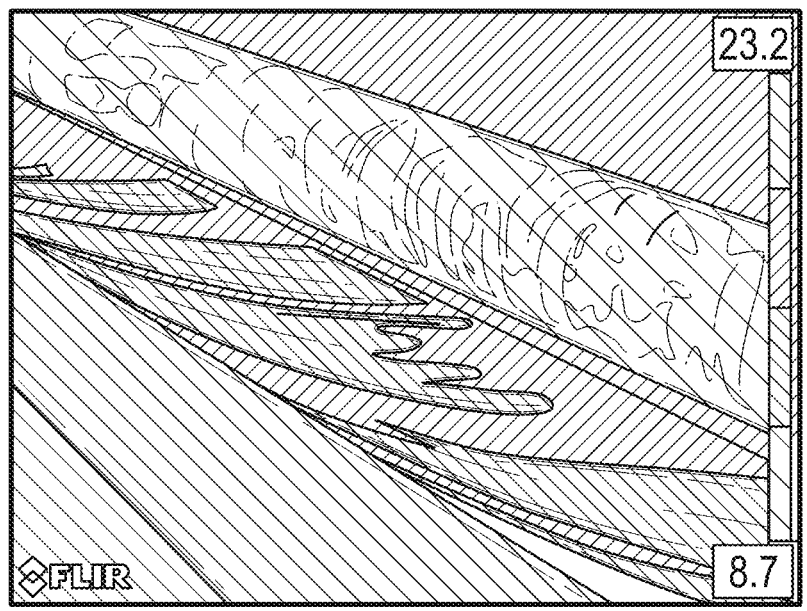
FIG. 18A is an infrared image that shows initial condensate drops on Sample A (20 degree channels)
Figure 18B:
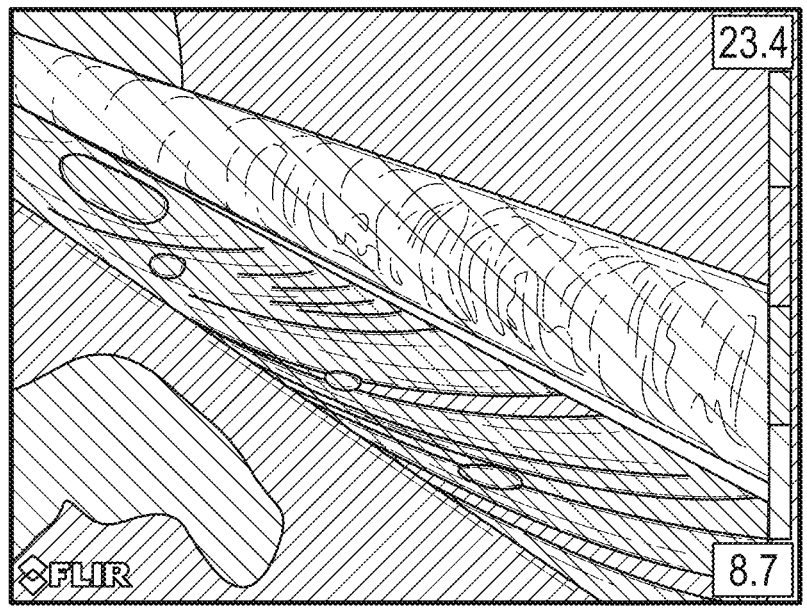
FIG. 18B shows Sample A in steady state with water spread to the edges of the film increasing evaporation rate.
Figure 19A:
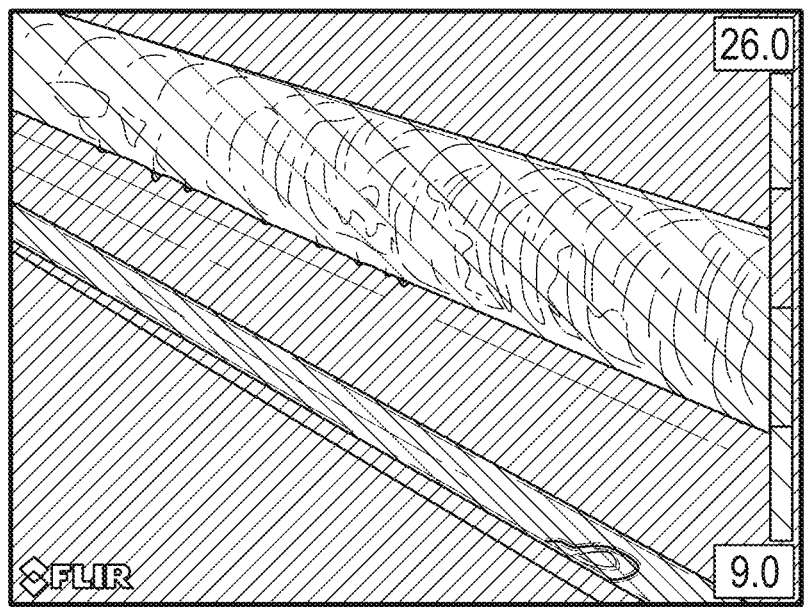
FIG. 19A is an infrared image that shows initial condensate drops on Sample B (0 degree channels)
Figure 19B:
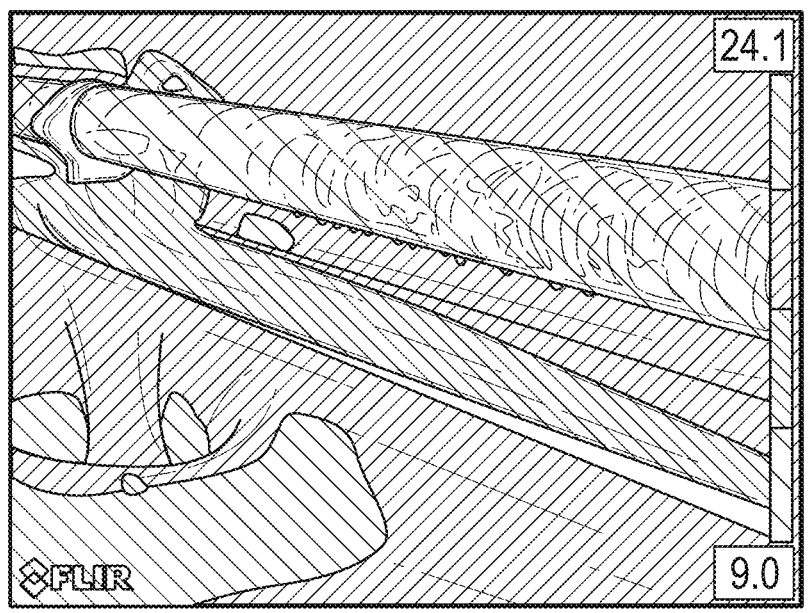
FIG. 19B shows Sample B in steady state wherein the water was observed to distribute along the leading edge of the clamp, then wick backwards (uphill) in the channels increasing the evaporation rate and actively transporting the condensate.
Figure 20A:
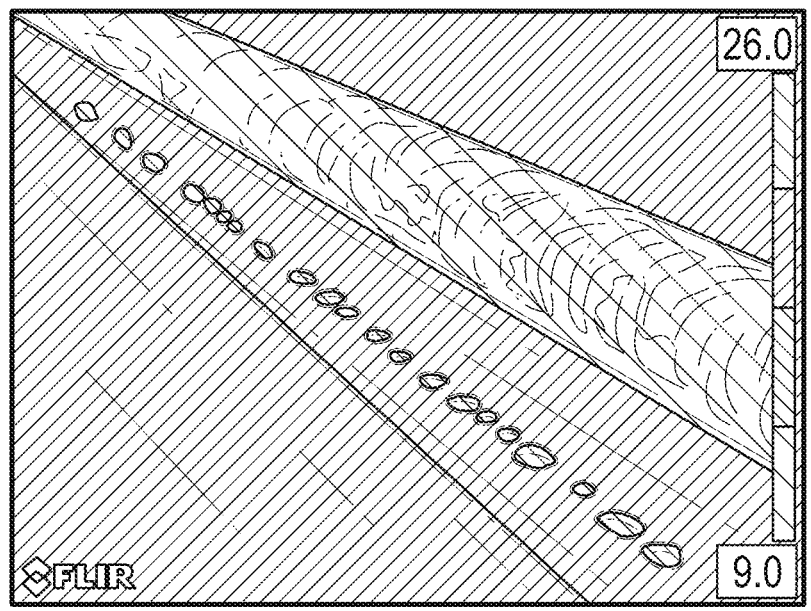
FIG. 20A is an infrared image that shows initial condensate drips on Sample F (no channels)
Figure 20B:
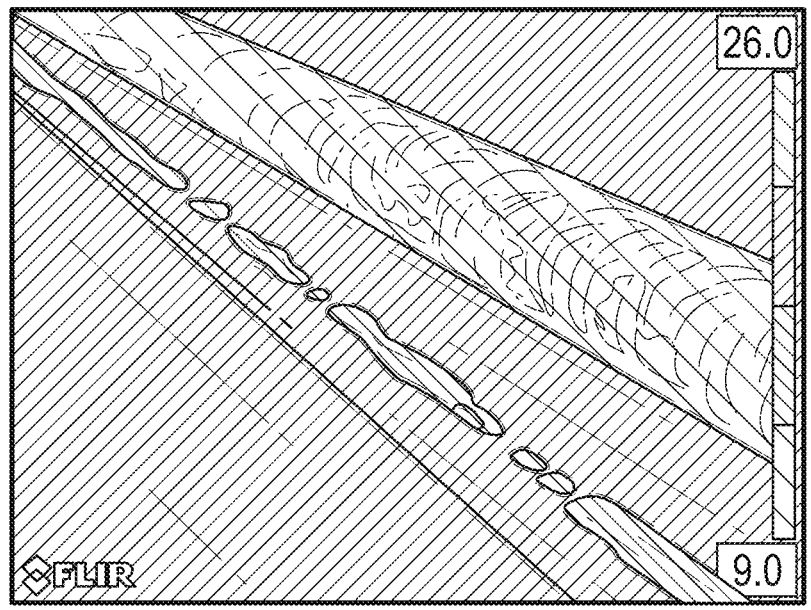
FIG. 20B shows Sample F in steady state.

Condensate Transport 4 inch wide films were secured and tensioned as described in example 1 with a separation distance between clamps of 120 cm. The pipe support on one end was lowered, producing a drop distance of 4 cm over the length of the film (3.3% slope). The pipe was end capped with hose fittings and cooled to an average surface temperature of 49.5 F using a recirculating cooler (Neslab Theromoflex 1400, Ashville, N.C.). Environmental conditions were an air temperature of 72 F and a relative humidity between 58 and 59%. A balance was placed under the clamp at the low end. To facilitate release of condensation, a small channel parallel to the pipe direction approximately 2 mm in diameter was generated in the clamp using a round file as shown in FIG. 14. Condensation formed on the pipe was captured by the film and transported to the low end, where it was collected in a beaker on the balance. Condensation, dripping, and transport were allowed to reach steady state (approximately 10 grams of water collected) prior to initiating data collection. After achieving steady state, the mass of water accumulating in the beaker was recorded for 180 minutes as shown in FIG. 17 and Table 6. Infrared images of the water on the film at initial and steady state condensation were obtained for films A, B, and F as shown in FIGS. 18A through 20B. FIG. 18A is an infrared image that shows initial condensate drops on Sample A (20 degree channels). FIG. 18B shows Sample A in steady state with water spread to the edges of the film increasing evaporation rate. FIG. 19A is an infrared image that shows initial condensate drops on Sample B (0 degree channels). FIG. 19B shows Sample B in steady state. For Sample B, the water was observed to distribute along the leading edge of the clamp, then wick backwards (uphill) in the channels increasing the evaporation rate and actively transporting the condensate. FIG. 20A is an infrared image that shows initial condensate drips on Sample F (no channels). FIG. 20B shows Sample F in steady state. Droplet coalescence can be observed in the image of FIG. 20B. Additional drops were observed to deposit in the coalesced area until liquid migration occurred. As the migrating liquid moved to the low end it fused with drops in the liquid path. After each migration event the pattern repeated itself.

Items described in this disclosure include the following items.

Item 1. A condensation management system comprising:
an elongated flexible film configured to be stretched under tension along a longitudinal axis of the film between a first film support and a second film support, the film comprising:
first and second ends extending laterally across width of the film;
first and second sides extending longitudinally between the first and second ends;
a concave surface extending between the first and second sides and an opposing convex surface extending between the first and second sides; and
microchannels disposed in at least one of the concave surface and the convex surface, the microchannels arranged at an angle greater than zero with respect to the longitudinal axis of the film and configured to induce a predetermined radius of curvature in the concave and convex surfaces of the film when the film is stretched longitudinally between the first and second film supports.

Item 2. The system of item 1 wherein the sides of the film are unsupported other than by the first support and the second film support.

Item 3. The system of item 2 wherein the predetermined radius of curvature is a function of the distance between the first and second supports.

Item 4. The system of item 3 wherein:
each of the first and second film supports has a substantially flat attachment surface to which the first and second ends of the flexible film are respectively attached;
a minimum value of the radius of curvature of the film occurs at a longitudinal intermediate point of the film between the first and second film supports; and
a maximum value of the radius of curvature occurs proximate to the first and second film supports.

Item 5. The system of item 3 wherein:
each of the first and second film supports has a curved attachment surface to which the first and second ends of the flexible film are respectively attached;
a minimum value of the radius of curvature of the film occurs proximate to at least one of the first and second film supports; and
a maximum value of the radius of curvature of the film occurs at an intermediate point of the film between the first and second film supports.

Item 6. The system of item 5 wherein the maximum value of the radius of curvature of the film is less than about five times a radius of curvature of the attachment surfaces of the first and second film supports.

Item 7. The system of any of items 1 through 6 wherein the film is removably attached to the first and second film supports.

Item 8. The system of any of items 1 through 7 wherein the microchannels extend along one or both of the concave surface of the film and the convex surface of the film.

Item 9. The system of any of items 1 through 8 further comprising a second set of microchannels wherein longitudinal axes of the microchannels are substantially parallel to a longitudinal axis of the film.

Item 10. The system of any of items 1 through 9 wherein longitudinal axes of the microchannels are disposed at an angle greater than 0 degrees and less than about 60 degrees with respect to a longitudinal axis of the film.

Item 11. The system of any of items 1 through 10 wherein a bottom of the film slopes downward along the direction of gravity between the first and second film supports.

Item 12. The system of item 11 wherein a downward slope of the film is between about 0.01 and 0.2.

Item 13. The system of any of items 1 through 12 wherein a stiffness of the film along one or both of a longitudinal axis and a lateral axis is between about 100 pounds per foot per linear inch and about 1500 pounds per foot per linear inch.

Item 14. The system of any of items 1 through 13 wherein the film comprises at least one of polyethelyne, polypropylene, polyester, co-polyester, and polyurethane.

Item 15. The system of any of items 1 through 14 wherein a ratio of width to length of the film is greater than about 0.01 and less than about 0.5.

Item 16. The system of any of items 1 through 15 wherein the longitudinal tension in the film is between about 2.5 pounds and about 12 pounds.

Item 17. The system of any of items 1 through 16 wherein at least one of the surfaces of the film is hydrophilic.

Item 18. The system of item 17 wherein the hydrophilic surface includes an organosilane coating.

Item 19. The system of any of items 1 through 18 wherein at least some of the microchannels are capillary channels configured to wick condensate in the channels against the force of gravity.

Item 20. A condensation management system comprising:
a first film support;
a second curved film support separated from the first support by a distance;
an elongated flexible film stretched between the first support and a second support, the film comprising:
a first end extending laterally across the film, the first end supported by the first support;
a second end extending laterally across the film, the second end supported by the second support;
first and second sides extending longitudinally between the first and second ends;
a concave surface extending between the first and second sides;
an opposing convex surface extending between the first and second sides.

Item 21. The system of item 20 wherein the sides of the film are unsupported other than by the first support and the second support Item 22. The system of any of items 20 through 21 wherein:
the first film support has a curved attachment surface to which the first end of the film is attached; and
the second film support has a curved attachment surface to which the second end of the film is attached.

Item 23. The system of any of items 20 through 22 wherein a lateral stiffness of the film is less than a longitudinal stiffness of the film.

Item 24. The system of item 20 further comprising microchannels disposed in at least one of the concave surface and the convex surfaces of the film, the microchannels configured to induce a predetermined radius of curvature in the concave and convex surfaces.

Item 25. The system of item 24 wherein the microchannels are capillary channels configured to wick fluid against the force of gravity.

Item 26. A condensation management device comprising
an attachment portion comprising a curved attachment surface;
a film retainer configured to attach an end of an elongated flexible film to the curved attachment surface, the curved attachment surface configured to impart a curve to the flexible film, the curved attachment surface and film retainer configured to operate together to secure the flexible film such that the film extends away from the attachment portion under tension; and
a mounting portion mechanically coupled to the attachment portion and configured to mount the condensation management device relative to a condensate forming surface in an orientation so that condensate that forms on the condensate forming surface falls onto a concave surface of the film.

Item 27. The device of item 26 wherein the curved attachment surface comprises one or more condensate drain notches configured to allow the condensate to drain from the film.

Item 28. The device of any of items 26 through 27 wherein:
the condensate forming surface is a surface of a pipe; and
the mounting portion is configured to at least partially encircle the pipe.

Item 29. The device of any of items 26 through 28 wherein the film retainer comprises a strap that at least partially encircles the curved surface.

Item 30. The device of any of items 26 through 29 wherein the curved attachment surface has a radius of curvature between about 3 cm to about 10 cm.

Item 31. The device of any of items 26 through 30 wherein the condensation management device includes a mechanism configured to facilitate replacement of the film, the replacement mechanism comprising:
a supply roll that holds a quantity of the film;
a waste roll, wherein rotation of the waste roll draws clean film from the supply roll while storing used film onto the waste roll.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of these embodiments will be apparent to those skilled in the art and it should be understood that this scope of this disclosure is not limited to the illustrative embodiments set forth herein. For example, the reader should assume that features of one disclosed embodiment can also be applied to all other disclosed embodiments unless otherwise indicated.

The invention claimed is:

1. A condensation management system comprising:
a first film support;
a second curved film support separated from the first support by a distance;
an elongated flexible film stretched between the first support and a second support, the film comprising:
a first end extending laterally across the film, the first end supported by the first support;
a second end extending laterally across the film, the second end supported by the second support;
first and second sides extending longitudinally between the first and second ends;
a concave surface extending between the first and second sides;
an opposing convex surface extending between the first and second sides;
wherein the sides of the film are unsupported other than by the first support and the second support.

2. The system of claim 1 wherein:
the first film support has a curved attachment surface to which the first end of the film is attached; and
the second film support has a curved attachment surface to which the second end of the film is attached.

3. The system of claim 1 wherein a lateral stiffness of the film is less than a longitudinal stiffness of the film.

4. The system of claim 1 further comprising microchannels disposed in at least one of the concave surface and the convex surfaces of the film, the microchannels configured to induce a predetermined radius of curvature in the concave and convex surfaces.

5. The system of claim 4, wherein the microchannels are capillary channels configured to wick fluid against the force of gravity.

6. A condensation management device comprising
an attachment portion comprising a curved attachment surface;
an elongated flexible film;
a film retainer configured to attach an end of the elongated flexible film to the curved attachment surface, the curved attachment surface configured to impart a curve to the flexible film, the curved attachment surface and film retainer configured to operate together to secure the flexible film such that the film extends away from the attachment portion under tension; and
a mounting portion mechanically coupled to the attachment portion and configured to mount the condensation management device relative to a condensate forming surface in an orientation so that condensate that forms on the condensate forming surface falls onto a concave surface of the film.

7. The device of claim 6 wherein the curved attachment surface comprises one or more condensate drain notches configured to allow the condensate to drain from the film.

8. The device of claim 6 wherein:
the condensate forming surface is a surface of a pipe; and
the mounting portion is configured to at least partially encircle the pipe.

9. The device of claim 6 wherein the film retainer comprises a strap that at least partially encircles the curved surface.

10. The device of claim 6 wherein the curved attachment surface has a radius of curvature between about 3 cm to about 10 cm.

11. The device of claim 6 wherein the condensation management device includes a mechanism configured to facilitate replacement of the film, the replacement mechanism comprising:
a supply roll that holds a quantity of the film;
a waste roll, wherein rotation of the waste roll draws clean film from the supply roll while storing used film onto the waste roll.

12. The device of claim 6, wherein the elongated flexible film comprises microchannels disposed on the concave surface of the film.

13. The device of claim 6, wherein the film comprises at least one of polyethelyne, polypropylene, polyester, co-polyester, and polyurethane.

* * * * *